United States Patent
Chang et al.

(10) Patent No.: US 12,316,868 B2
(45) Date of Patent: May 27, 2025

(54) MOTION VECTOR (MV) CANDIDATE REORDERING

(71) Applicant: QUALCOMM Incorporated, San Diego, CA (US)

(72) Inventors: Yao-Jen Chang, San Diego, CA (US); Han Huang, San Diego, CA (US); Vadim Seregin, San Diego, CA (US); Chun-Chi Chen, San Diego, CA (US); Marta Karczewicz, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 17/820,863

(22) Filed: Aug. 18, 2022

(65) Prior Publication Data

US 2023/0103767 A1    Apr. 6, 2023

Related U.S. Application Data

(60) Provisional application No. 63/265,490, filed on Dec. 15, 2021, provisional application No. 63/264,342, (Continued)

(51) Int. Cl.
   *H04N 19/00*    (2014.01)
   *H04N 19/105*   (2014.01)
   (Continued)

(52) U.S. Cl.
   CPC ........... *H04N 19/52* (2014.11); *H04N 19/105* (2014.11); *H04N 19/139* (2014.11); (Continued)

(58) Field of Classification Search
   CPC ...................................... H04N 19/00
   See application file for complete search history.

(56) References Cited

U.S. PATENT DOCUMENTS

| | | | |
|---|---|---|---|
| 2020/0068218 A1* | 2/2020 | Chen | H04N 19/82 |
| 2021/0329228 A1* | 10/2021 | Zhao | H04N 19/159 |
| 2023/0104476 A1* | 4/2023 | Chen | H04N 19/88 |
| | | | 375/240.02 |

FOREIGN PATENT DOCUMENTS

WO    2018205914 A1    11/2018

OTHER PUBLICATIONS

Chang Y-J., (Qualcomm) et al., "EE2-Related: MV Candidate Type-Based ARMC", 24th JVET Meeting, Oct. 6, 2021-Oct. 15, 2021, Teleconference (The Joint Video Exploration Team of ISO/IEC JTC1/SC29/WG11 and ITU-T SG.16), No. JVET-X0133-V2, m57934 Oct. 8, 2021, XP030298037, pp. 1-4.

Chang Y-J., (Qualcomm) et al., "Non-EE2: MV Candidate Type-Based ARMC", 24th MPEG Meeting, Oct. 11, 2021-Oct. 15, 2021, Online (Motion Picture Expert Group or ISO/IEC JTC1/SC29/WG11), No. m57934, JVET-X0133-v1, Sep. 30, 2021, XP030297729, pp. 1-3, Sections 1 and 2.

(Continued)

*Primary Examiner* — Maryam A Nasri
(74) *Attorney, Agent, or Firm* — Polsinelli LLP

(57) ABSTRACT

Systems and techniques are provided for coding video data. In some examples, a process may include obtaining a first plurality of prediction candidates associated with video data. The process may further include determining a first group of prediction candidates at least in part by applying a first grouping method to the first plurality of prediction candidates. The process may include reordering the first group of prediction candidates and selecting a first merge candidate from the reordered first group of prediction candidates. The process may further include adding the first merge candidate to a candidate list.

25 Claims, 19 Drawing Sheets

Related U.S. Application Data filed on Nov. 19, 2021, provisional application No. 63/252,094, filed on Oct. 4, 2021, provisional application No. 63/250,134, filed on Sep. 29, 2021.

(51) Int. Cl.
  *H04N 19/139* (2014.01)
  *H04N 19/159* (2014.01)
  *H04N 19/172* (2014.01)
  *H04N 19/176* (2014.01)
  *H04N 19/42* (2014.01)
  *H04N 19/52* (2014.01)
  *H04N 19/88* (2014.01)

(52) U.S. Cl.
  CPC ......... *H04N 19/159* (2014.11); *H04N 19/172* (2014.11); *H04N 19/176* (2014.11); *H04N 19/42* (2014.11); *H04N 19/88* (2014.11)

(56) References Cited

OTHER PUBLICATIONS

Coban M., et al., "Algorithm Description of Enhanced Compression Model 2 (ECM 2)", 23rd, MPEG Meeting, Jul. 7, 2021-Jul. 16, 2021, Online, (Motion Picture Expert Group or ISO/IEC JTC1/SC29/WG11), No. M57745, JVET-W2025, Sep. 1, 2021, XP030297803, pp. 1-22, section [3.2.4 Multi-pass decoder-side motion vector refinement] section [3.2.8 Multi-hypothesis prediction (MHP)].
International Search Report and Written Opinion—PCT/US2022/075229—ISA/EPO—Nov. 25, 2022.
Zhang (Bytedance) N., et al., "EE2-3.1/EE2-3.2: Adaptive Reordering of Merge Candidates with Template/Bilateral Matching", 23rd JVET Meeting, Jul. 7, 2021-Jul. 16, 2021, Teleconference, (The Joint Video Exploration Team of ISO/IEC JTC1/SC29/WG11 and ITU-T SG.16), No. JVET-W0090-V2, m57205 Jul. 5, 2021, XP030295994, pp. 1-5, Abstract, Sections 1-2.2.

\* cited by examiner

MOTION VECTOR (MV) CANDIDATE REORDERING

CROSS-REFERENCE TO RELATED APPLICATIONS

This application claims the benefit of U.S. Provisional Application No. 63/250,134, filed Sep. 29, 2021, U.S. Provisional Application No. 63/252,094, filed Oct. 4, 2021, U.S. Provisional Application No. 63/264,342, filed Nov. 19, 2021, and U.S. Provisional Application No. 63/265,490, filed Dec. 15, 2021, all of which are hereby incorporated by reference, in their entirety and for all purposes.

TECHNICAL FIELD

This application is related to video coding (e.g., encoding and/or decoding of video data). For instance, aspects of the application relate to motion vector (MV) candidate reordering (e.g., for merge modes).

BACKGROUND

Many devices and systems allow video data to be processed and output for consumption. Digital video data generally includes large amounts of data to meet the demands of video consumers and providers. For example, consumers of video data desire video of high quality, fidelity, resolution, frame rates, and the like. As a result, the large amount of video data that is required to meet these demands places a burden on communication networks and devices that process and store the video data.

Various video coding techniques may be used to compress video data. Video coding techniques can be performed by an encoder-decoder (referred to as a codec) according to one or more video coding standards and/or formats. For example, video coding standards and formats include high-efficiency video coding (HEVC), advanced video coding (AVC), moving picture experts group (MPEG) 2 part 2 coding, VP9, Alliance of Open Media (AOMedia) Video 1 (AV1), Essential Video Coding (EVC), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with improved coding accuracy or efficiency are needed.

SUMMARY

Systems and techniques are described herein for improved video processing, such as video encoding and/or decoding. For example, a system can perform motion vector (MV) candidate reordering (e.g., for merge modes), such as using multiple-stage (e.g., two-stage) adaptive reordering of merge candidates (ARMC) technique.

In one illustrative example, an apparatus for processing video data, the apparatus comprising: at least one memory; and at least one processor coupled to the at least one memory, the at least one processor being configured to: obtain a first plurality of prediction candidates associated with video data; determine a first group of prediction candidates at least in part by applying a first grouping method to the first plurality of prediction candidates; reorder the first group of prediction candidates; select a first merge candidate from the reordered first group of prediction candidates; and add the first merge candidate to a candidate list.

In another example, a method of coding video data, the method comprising: obtaining a first plurality of prediction candidates associated with video data; determining a first group of prediction candidates at least in part by applying a first grouping method to the first plurality of prediction candidates; reordering the first group of prediction candidates; selecting a first merge candidate from the reordered first group of prediction candidates; and adding the first merge candidate to a candidate list.

In another example, anon-transitory computer-readable medium having stored thereon instructions that, when executed by at least one processor, cause the at least one processor to: obtain a first plurality of prediction candidates associated with video data; determine a first group of prediction candidates at least in part by applying a first grouping method to the first plurality of prediction candidates; reorder the first group of prediction candidates; select a first merge candidate from the reordered first group of prediction candidates; and add the first merge candidate to a candidate list.

In another example, an apparatus for coding video data, the apparatus including: means for obtaining a first plurality of prediction candidates associated with video data; means for determining a first group of prediction candidates at least in part by applying a first grouping method to the first plurality of prediction candidates; means for reordering the first group of prediction candidates; means for selecting a first merge candidate from the reordered first group of prediction candidates; and means for adding the first merge candidate to a candidate list.

In some aspects, the system can be or can be part of a mobile device (e.g., a mobile telephone or so-called "smart phone", a tablet computer, or other type of mobile device), a network-connected wearable device, an extended reality device (e.g., a virtual reality (VR) device, an augmented reality (AR) device, or a mixed reality (MR) device), a personal computer, a laptop computer, a server computer (e.g., a video server or other server device), a television, a vehicle (or a computing device or system of a vehicle), a camera (e.g., a digital camera, an Internet Protocol (IP) camera, etc.), a multi-camera system, a robotics device or system, an aviation device or system, or other device. In some aspects, the system includes at least one camera for capturing one or more images or video frames. For example, the system can include a camera (e.g., an RGB camera) or multiple cameras for capturing one or more images and/or one or more videos including video frames. In some aspects, the system includes a display for displaying one or more images, videos, notifications, or other displayable data. In some aspects, the system includes a transmitter configured to transmit one or more video frame and/or syntax data over a transmission medium to at least one device. In some aspects, the system described above can include one or more sensors. In some aspects, the processor includes a neural processing unit (NPU), a central processing unit (CPU), a graphics processing unit (GPU), or other processing device or component.

The foregoing, together with other features and examples, will become more apparent upon referring to the following specification, claims, and accompanying drawings.

BRIEF DESCRIPTION OF THE DRAWINGS

Examples of various implementations are described in detail below with reference to the following figures.

DETAILED DESCRIPTION

Figure 1:
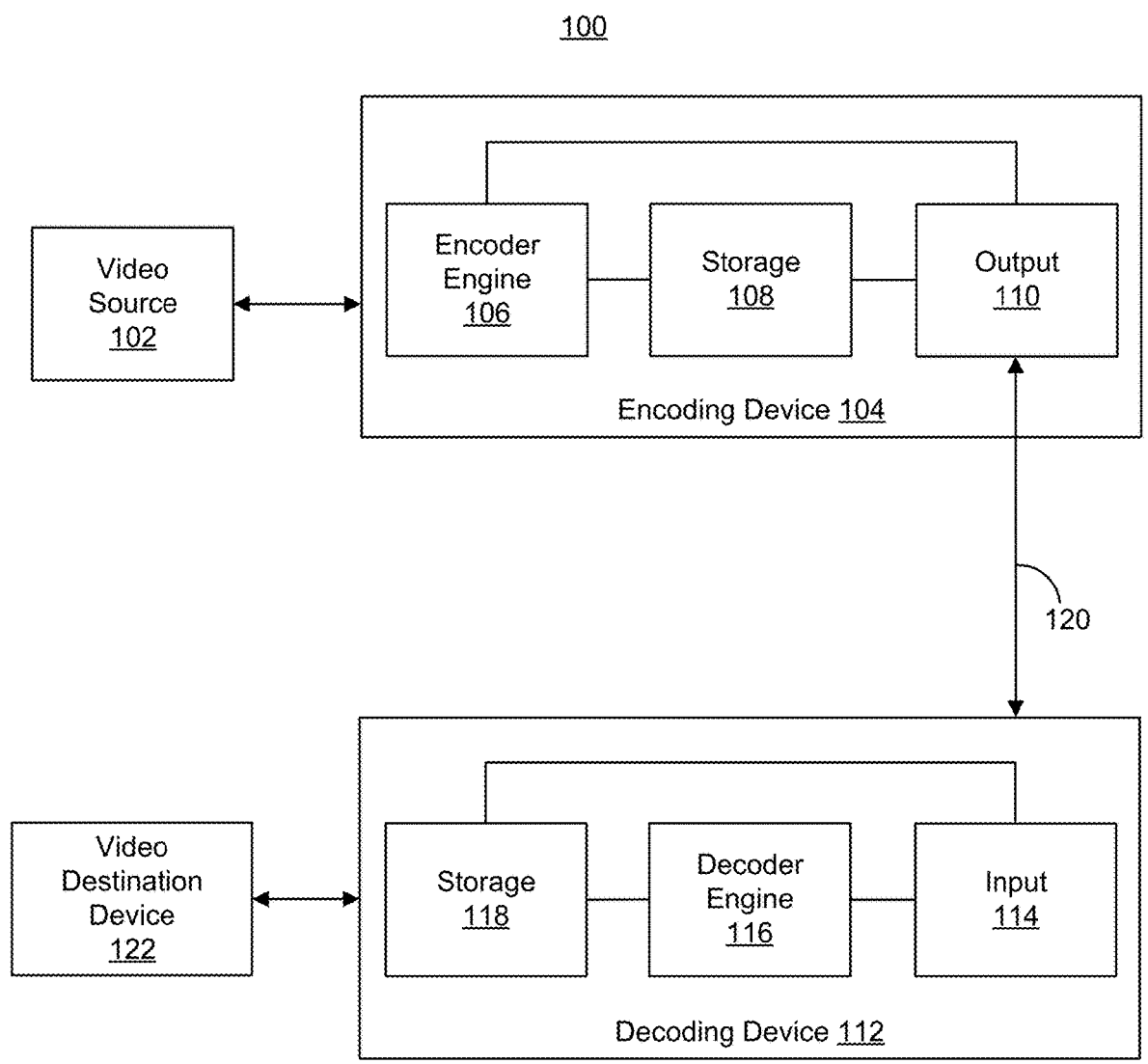
FIG. 1 is a block diagram illustrating an encoding device and a decoding device, in accordance with some examples.

Certain aspects and examples of the disclosure are provided below. Some of these aspects and examples may be applied independently and some of them may be applied in combination as would be apparent to those of skill in the art. In the following description, for the purposes of explanation, specific details are set forth in order to provide a thorough understanding of examples of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description of various examples will provide those skilled in the art with an enabling description for implementing a particular example. It should be understood that various changes may be made in the function and arrangement of elements without departing from the spirit and scope of the application as set forth in the appended claims.

Video coding devices implement video compression techniques to encode and decode video data efficiently. Versatile Video Coding (VVC), for example, is a latest video coding standard that was developed by Joint Video Experts Team (JVET) of ITU-T and ISO/IEC to achieve substantial compression capability beyond HEVC for a broaden range of applications. The VVC specification has been finalized in July 2020 and published by both ITU-T and ISO/IEC. The VVC specification specifies normative bitstream and picture formats, high level syntax (HLS) and coding unit level syntax, and the parsing and decoding process. VVC also specifies profiles/tiers/levels (PTL) restrictions, byte stream format, hypothetical reference decoder and supplemental enhancement information (SEI) in the annex. Recently, NET has been developing an Enhanced Compression Model (ECM) software to enhance compression capability beyond VVC. The set of coding tools in the ECM software encompasses all functional blocks in the hybrid video coding framework, including intra prediction, inter prediction, transform and coefficient coding, in-loop filtering, and entropy coding.

Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error using transform coding (e.g., using a form of a discrete cosine transform (DCT), a form of a discrete sine transform (DST), or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

In some cases, a video coding device (e.g., a video encoder, a video decoder, or a combined encoder-decoder or codec) can apply one or more merge modes to a current block of video data being coded (e.g., encoded and/or decoded) to inherit information from another block. For example, in applying a merge mode to the current block, the video coding device can obtain the same motion vector or vectors, prediction direction, and/or reference picture index or indices from another block (e.g., another inter-predicted PU or other block) for the current block. Efficient systems and techniques are needed for performing a merge mode.

As described in more detail below, systems, apparatuses, methods (also referred to as processes), and computer-readable media (collectively referred to as "systems and techniques") are described herein for performing motion vector (MV) candidate reordering, such as for merge modes. In some aspects, a multi-stage (e.g., a two-stage) adaptive reordering of merge candidates (ARMC) is provided. For instance, in a first ARMC stage, a coding device (e.g., an encoding device, a decoding device, or a combined encoding-decoding device or codec) can use a first grouping method to group prediction candidates. The coding device may apply reordering within each group (e.g., individually within each group). The coding device can then construct a first merge candidate list in order by the groups that are processed by the first ARMC stage. The coding device can use the first merge candidate list as input to a second ARMC stage. In the second ARMC stage, the coding device can use a second grouping method for grouping the candidates. The coding device can apply reordering within each group (e.g., individually within each group) of the candidates generated by the second grouping method. The coding device can then construct a second merge candidate list in order by the groups that are processed by the second ARMC stage. Further aspects are described in detail below.

The systems and techniques described herein can be applied to one or more of a variety of block-based video coding techniques in which video is reconstructed on block-by-block basis. For example, the systems and techniques described herein can be applied to any of the existing video codecs (e.g., VVC, HEVC, AVC, or other suitable existing video codec), and/or can be an efficient coding tool for any video coding standards being developed and/or future video coding standards. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), VP9, AV1, extensions thereof, or other suitable coding standards already available or not yet available or developed. For instance, in some examples, the systems and techniques may operate according to a proprietary video codec/format, such as AV1, extensions of AV1, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Various aspects of the systems and techniques described herein will be discussed herein with respect to the figures.

FIG. 1 is a block diagram illustrating an example of a system 100 including an encoding device 104 and a decoding device 112 that can perform one or more of the techniques described herein. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, the system 100 can support one-way or two-way video transmission to support applications such as video conferencing, video streaming, video playback, video broadcasting, gaming, and/or video telephony.

The encoding device 104 (or encoder) can be used to encode video data using a video coding standard, format, codec, or protocol to generate an encoded video bitstream. Examples of video coding standards and formats/codecs include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, and Versatile Video Coding (VVC) or ITU-T H.266. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). VP9, AOMedia Video 1 (AV1) developed by the Alliance for Open Media Alliance of Open Media (AOMedia), and Essential Video Coding (EVC) are other video coding standards for which the techniques described herein can be applied.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 106.

Once the pictures of the video data are partitioned into CUs, the encoder engine 106 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and the decoder engine 116 (described in more detail below) may be configured to operate according to VVC. According to VVC, a video coder (such as the encoder engine 106 and/or the decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, encoding device 104 and decoding device 112 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Encoding device 104 may further partition a superblock into smaller coding blocks. Encoding device 104 may partition a superblock and other coding blocks into smaller blocks using square or non-square partitioning. Non-square blocks may include N/2×N, N×N/2, N/4×N, and N×N/4 blocks. Encoding device 104 and decoding device 112 may perform separate prediction and transform processes on each of the coding blocks.

AV1 also defines a tile of video data. A tile is a rectangular array of superblocks that may be coded independently of other tiles. That is, encoding device 104 and decoding device 112 may encode and decode, respectively, coding blocks within a tile without using video data from other tiles. However, encoding device 104 and decoding device 112 may perform filtering across tile boundaries. Tiles may be uniform or non-uniform in size. Tile-based coding may enables parallel processing and/or multi-threading for encoder and decoder implementations.

In some examples, the encoding device 104 and decoding device 112 can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The encoding device 104 and decoding device 112 can be configured to use quadtree partitioning per HEVC, QTBT partitioning, MTT partitioning, or other partitioning structures.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 3

Specification of intra-prediction mode and associated names

| Intra-prediction mode | Associated name |
|---|---|
| 0 | INTRA_PLANAR |
| 1 | INTRA_DC |
| 2 ... 34 | INTRA_ANGULAR2 ... INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$,refIdx$_0$ and $\Delta x_1$, $y_1$,refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction (also referred to as uni-directional inter-prediction), one set of motion parameters ($\Delta x_0$, $y_0$,refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, encoding device 104 and decoding device 112 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. The encoder engine 106 may form the TUs including the residual data for the CU, and may transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 106. In some examples, the encoder engine 106 may utilize a predefined scan order to scan the quantized transform coefficients to produce a serialized vector that can be entropy encoded. In some examples, the encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communication link 120 to the decoding device 112 of the receiving device. The input 114 of the decoding device 112 may receive the NAL units. The communication link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in a storage 108. The output 110 may retrieve the encoded video bitstream data from the encoder engine 106 or from the storage 108. The storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection, and may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to the storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may rescale and perform an inverse transform on the encoded video bitstream data. Residual data is passed to a prediction stage of the decoder engine 116. The decoder engine 116 predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 17. An example of specific details of the decoding device 112 is described below with reference to FIG. 18.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, through n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. In some examples, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS.

The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

This disclosure may generally refer to "signaling" certain information, such as syntax elements. The term "signaling" may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

As described above, for each block, a set of motion information (also referred to herein as motion parameters) can be available. A set of motion information can contain motion information for forward and backward prediction directions. Here, forward and backward prediction directions are two prediction directions of a bi-directional prediction mode and the terms "forward" and "backward" do not necessarily have a geometry meaning. Instead, forward and backward can correspond to a reference picture list 0 (RefPicList0) and a reference picture list 1 (RefPicList1) of a current picture, slice, or block. In some examples, when only one reference picture list is available for a picture, slice, or block, only RefPicList0 is available and the motion information of each block of a slice is always forward. In some examples, RefPicList0 includes reference pictures that precede a current picture in time, and RefPicList1 includes reference pictures that follow the current picture in time. In some cases, a motion vector together with an associated reference index can be used in decoding processes. Such a motion vector with the associated reference index is denoted as a uni-predictive set of motion information.

For each prediction direction, the motion information can contain a reference index and a motion vector. In some cases, for simplicity, a motion vector can have associated information, from which it can be assumed a way that the motion vector has an associated reference index. A reference index can be used to identify a reference picture in the current reference picture list (RefPicList0 or RefPicList1). A motion vector can have a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, within one coded video sequence two pictures with the same POC value does not occur often. When multiple coded video sequences are present in a bitstream, pictures with a same POC value may be closer to each other in terms of decoding order. POC values of pictures can be used for reference picture list construction, derivation of reference picture set as in HEVC, and/or motion vector scaling, among other things.

In some examples, the encoding device 104 and/or the decoding device 112 can utilize a merge mode that allows a block (e.g., an inter-predicted PU or other block) to inherit the same motion vector or vectors, prediction direction, and/or reference picture index or indices from another block (e.g., another inter-predicted PU or other block). In ECM, the regular merge candidate list is constructed by including the following six types of candidates in order:

Spatial MVP (SMVP) from spatial neighbour CUs: A maximum of four merge candidates may be selected among candidates located in the positions depicted in FIG. 2. The order of derivation is $B_0$, $A_0$, $B_1$, $A_1$, and $B_2$. In some cases, position $B_2$ is considered only when one or more than one CU of position $B_0$, $A_0$, $B_1$, $A_1$ are not available (e.g., because it belongs to another slice or tile) or is intra coded.

Figure 3:
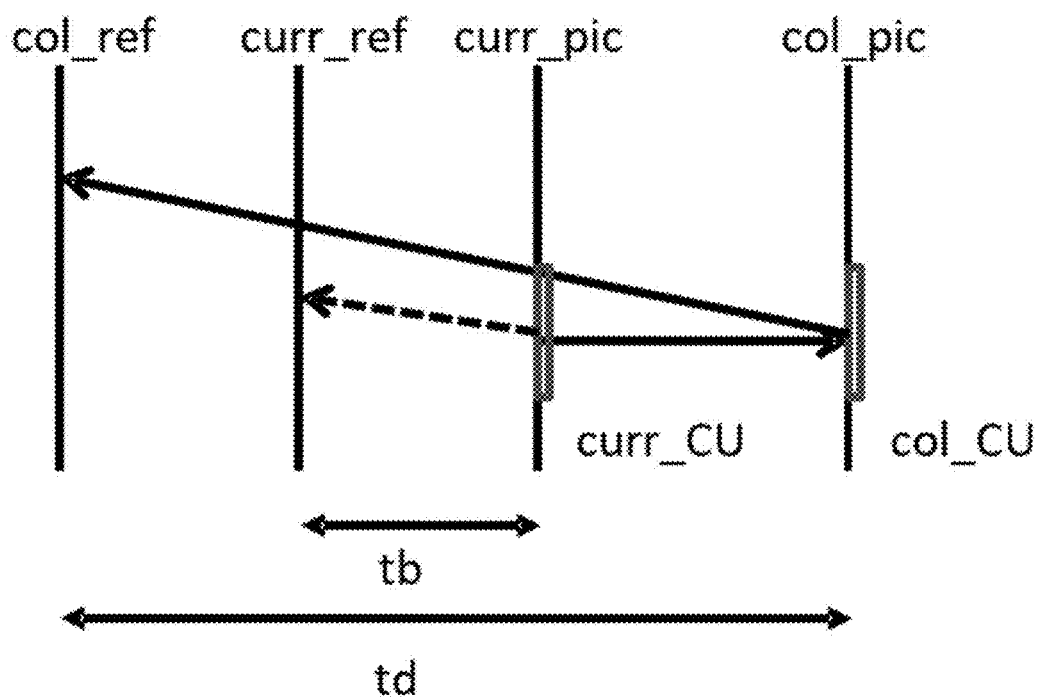
FIG. 3 is a diagram illustrating an example of motion vector scaling for temporal merge candidate, in accordance with examples described herein.
Figure 4:
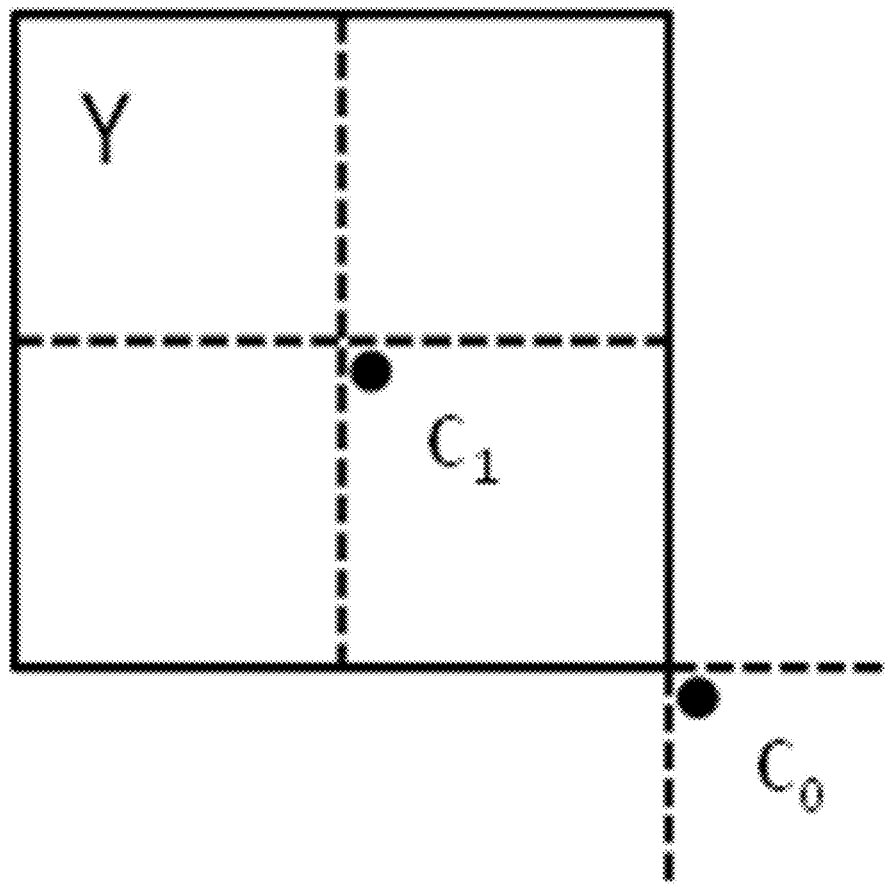
FIG. 4 is a diagram illustrating an example of candidate positions for temporal merge candidates, in accordance with examples described herein.

Temporal MVP (TMVP) from collocated CUs: In some cases, only one TMVP candidate is added to the list. In the derivation of this TMVP candidate, a scaled motion vector is derived based on co-located CU belonging to the collocated reference picture. The reference picture list to be used for derivation of the co-located CU is explicitly signalled in the slice header. The scaled motion vector for TMVP candidate is obtained, as illustrated by the dotted line in FIG. 3, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. That is, the MV of the currCU (referring to the current CU) equals to the MV of col_CU multiplying tb/td. The reference picture index of TMVP candidate is set equal to zero. The position for the temporal candidate is selected between candidates $C_0$ and $C_1$, as depicted in FIG. 4. If CU at position $C_0$ is not available, is intra coded, or is outside of the current row of CTUs, position $C_1$ is used. Otherwise, position $C_0$ is used in the derivation of the TMVP candidate.

Figure 5:
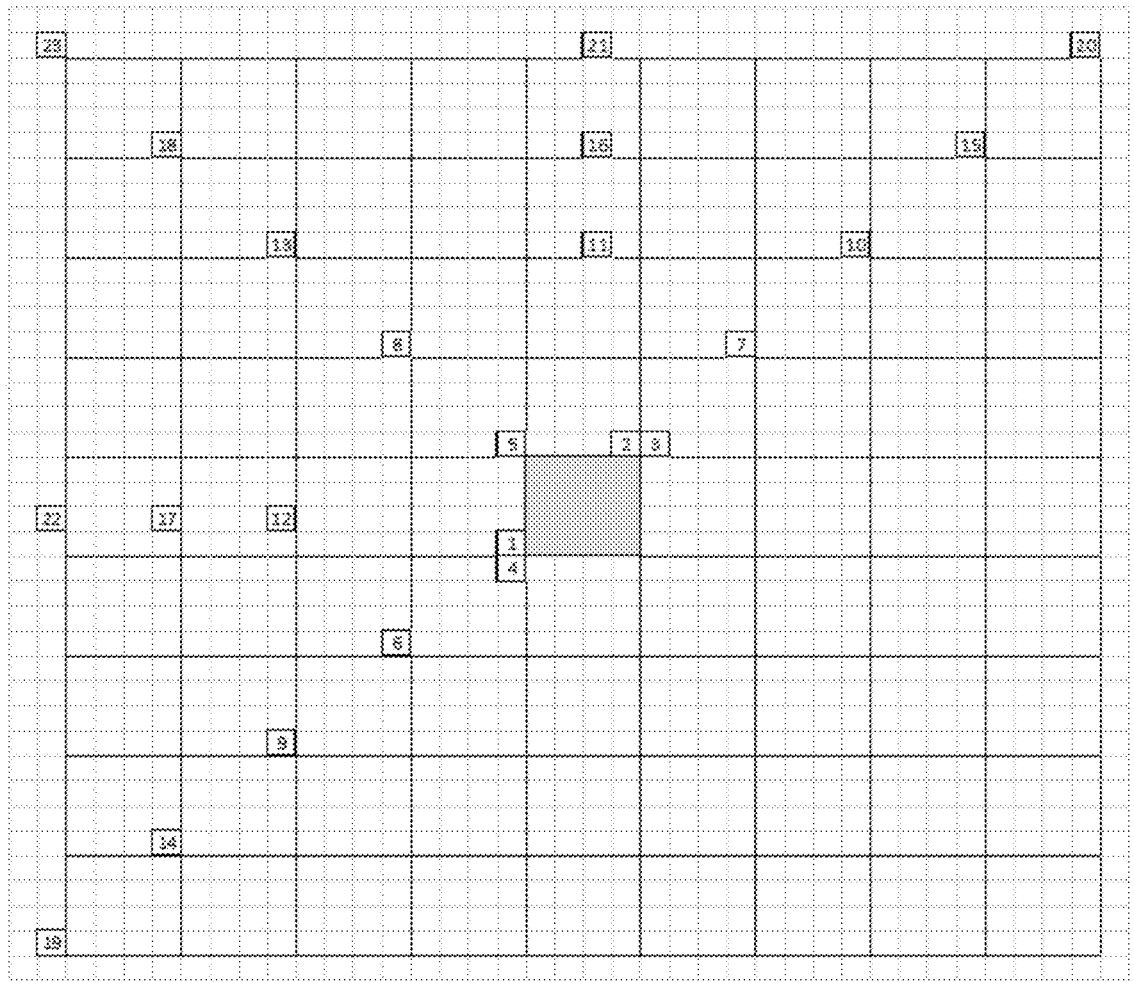
FIG. 5 is a diagram illustrating an example of spatial neighboring blocks used to derive spatial merge candidates, in accordance with examples described herein.

Non-adjacent spatial MVP (NA-SMVP) from spatially non-adjacent neighbour CUs: The non-adjacent spatial merge candidates (e.g., as described in JVET-L0399, which is incorporated herein by reference in its entirety and for all purposes) are inserted after the TMVP in the regular merge candidate list. An example of a pattern of the spatial merge candidates is shown in FIG. 5, where blocks 1 to 5 are used for SMVP, and blocks 6 to 23 are used for NA-SMVP. The distances between the non-adjacent spatial candidates and the current coding block are based on the width and height of the current coding block.

History-based MVP (HMVP) from a FIFO table: The motion information of a previously coded block is stored in a table and used as HMVP for the current CU. The table with multiple HMVP candidates is maintained during the encoding and/or decoding process. Whenever there is a non-subblock inter-coded CU, the associated motion information is added to the last entry of the table as a new HMVP candidate. The HMVP table size is set to be 6, which indicates up to 6 HMVP candidates may be added to the table. When inserting a new motion candidate to the table, a constrained first-in-first-out (FIFO) rule is utilized wherein redundancy check is firstly applied to find whether there is an identical HMVP in the table.

Pairwise average MVP (PA-MVP): Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

Zero MVs: When the merge list is not full after pair-wise average merge candidates are added, the zero MVPs are inserted in the end until the maximum merge candidate number is encountered.

In some cases, the encoding device 104 and/or the decoding device 112 can construct a template matching (TM) merge candidate list. For instance, in ECM, the TM merge candidate list is constructed based on the same six types of candidates in order as used in regular merge candidate list described above. TM is a decoder-side MV derivation method to refine the MV information of each candidate in the TM merge candidate list by finding the closest match between a template in the current picture and a block with the same size to the template in a reference picture. TM may work with block-based and subblock-based bilateral matching (BM) methods depending on whether BM can be enabled or not according to its enabling condition checks. When BM and TM are both enabled for a CU, the search process of TM stops at half-pel MVD precision and the resulted MVs are further refined by using the same model-based MVD derivation method as in DMVR.

Figure 6A:
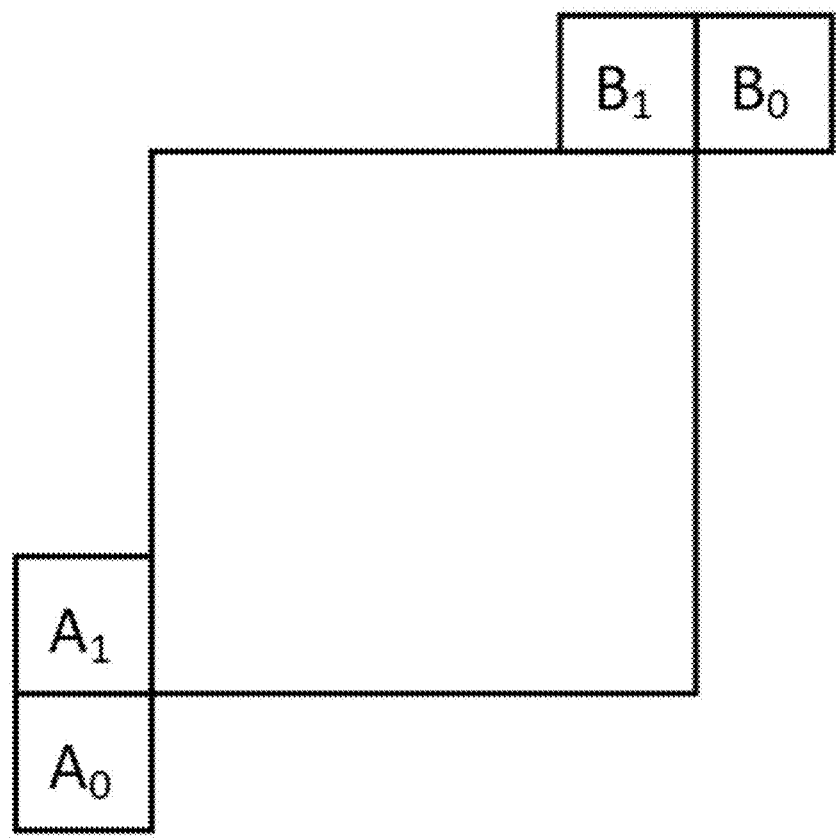
FIG. 6A is a diagram illustrating an example of spatial neighboring blocks used by subblock-based temporal motion vector prediction (SbTMVP) in VVC, in accordance with examples described herein.
Figure 6B:
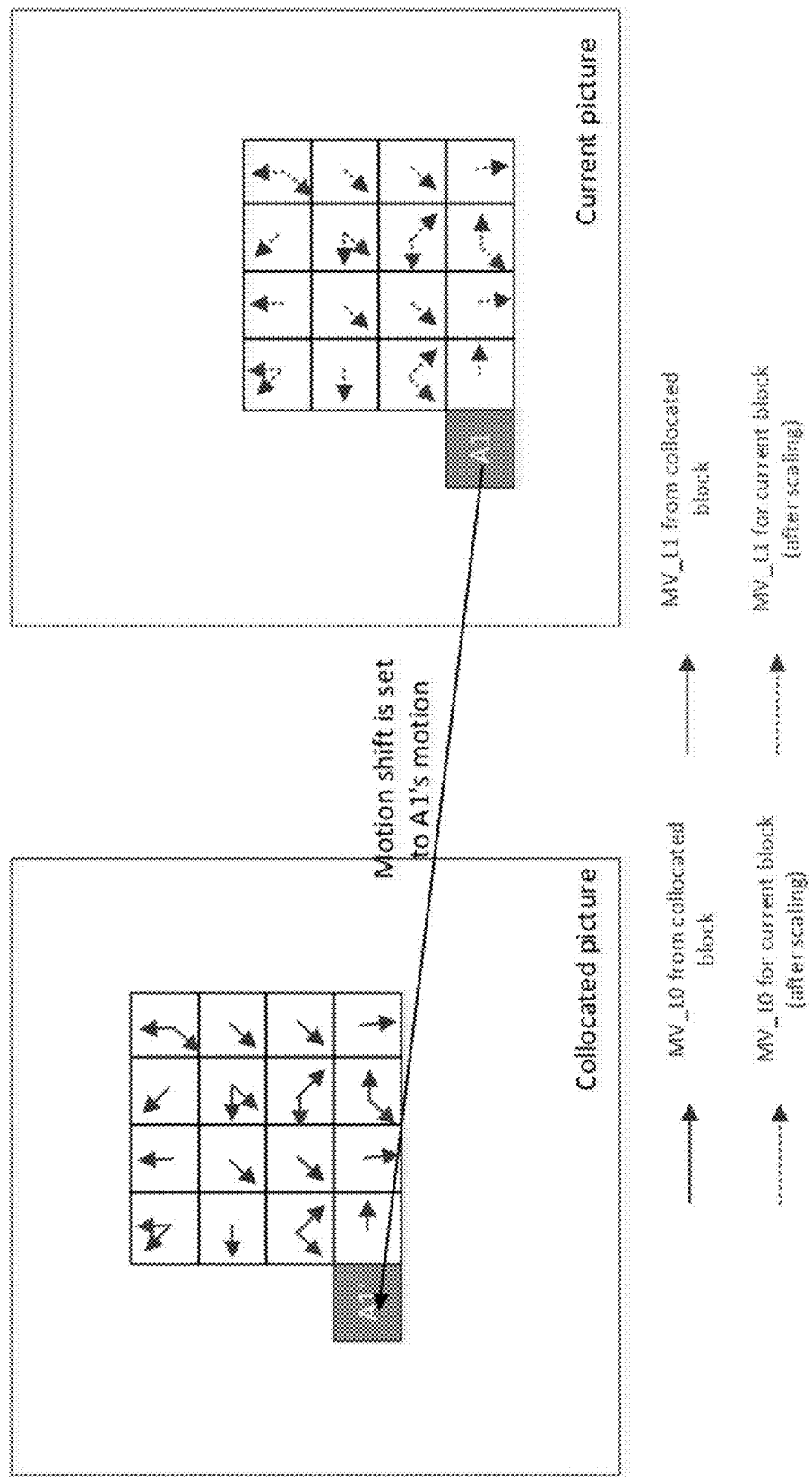
FIG. 6B is a diagram illustrating an example of derivation of a sub-coding unit (CU) motion field by applying a motion shift from spatial neighbor and scaling the motion information from the corresponding collocated sub-CUs, in accordance with examples described herein.

In some cases, the encoding device 104 and/or the decoding device 112 can perform subblock-based temporal motion vector prediction (SbTMVP). For instance, SbTMVP can be used to predict the motion vectors of the sub-CUs within the current CU in two steps, for example as illustrated in FIG. 6A and FIG. 6B. For instance, in a first step, the spatial neighbor A1 in FIG. 6A is examined. If A1 has a motion vector that uses the collocated picture as its reference picture, this motion vector is selected to be the motion shift to be applied. If no such motion is identified, then the motion shift is set to (0, 0). In a second step, the motion shift identified in Step 1 is added to the current block's coordinates to obtain sub-CU-level motion information (motion vectors and reference indices) from the collocated picture as shown in FIG. 6B. The example in FIG. 6B assumes the motion shift is set to block A1's motion. After the motion information of the collocated sub-CU is identified, it is converted to the motion vectors and reference indices of the current sub-CU in a similar way as the TMVP process of VVC, where temporal motion scaling is applied to align the reference pictures of the temporal motion vectors to those of the current CU. The SbTMVP predictor is added as the first entry of the list of subblock based merge candidates, and followed by the affine merge candidates. SbTMVP differs from TMVP in at least the following aspects:

TMVP predicts motion at CU level but SbTMVP predicts motion at sub-CU level;

Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

In some examples, the encoding device 104 and/or the decoding device 112 can construct a subblock merge candidate list. For example, the following four types of subblock merge candidates can be used in order to construct the subblock merge candidate list (e.g., the first entry of the subblock merge candidate list is SbTMVP, and the other entries are Affine merge candidates):

SbTMVP: the sbTMVP predictors are added as described above (e.g., an SbTMVP predictor is added as the first entry of the list of subblock based merge candidates, and followed by the affine merge candidates).

Figure 2:
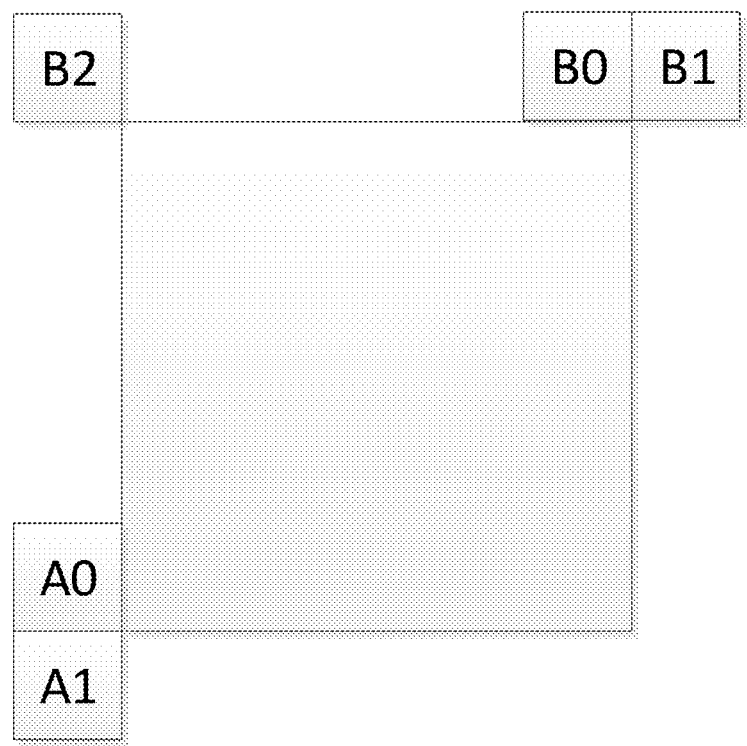
FIG. 2 is a diagram illustrating an example of positions of spatial motion vector (MV) candidates, in accordance with examples described herein.

Inherited affine merge candidates (I-AffineMVP) that extrapolated from the CPMVs of the neighbour CUs: There are a maximum of two inherited affine candidates, which are derived from affine motion model of the neighboring blocks, one from left neighboring CUs and one from above neighboring CUs. The candidate blocks are shown in FIG. 2. For the left predictor, the scan order is A0->A1, and for the above predictor, the scan order is B0->B1->B2. Only the first inherited candidate from each side is selected. No pruning check is performed between two inherited candidates. When a neighboring affine CU is identified, its control point motion vectors are used to derive the CPMVs of an affine merge candidate of the current CU.

Figure 7:
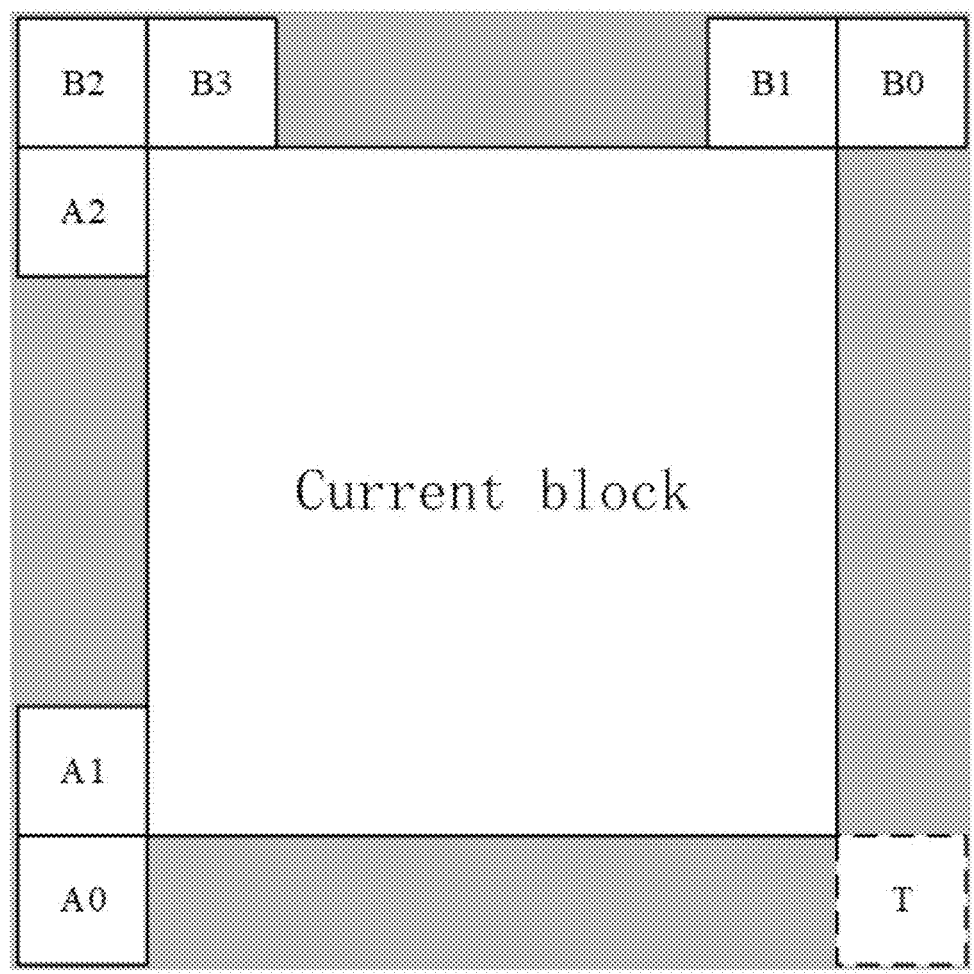
FIG. 7 is a diagram illustrating an example of locations of candidates position for constructed affine merge mode, in accordance with examples described herein.

Constructed affine merge candidates (C-AffineMVP) that are derived using the translational MVs of the neighbour CUs: A constructed affine candidate means the candidate is constructed by combining the neighbor translational motion information of each control point. The motion information for the control points is derived from the specified spatial neighbors and temporal neighbor shown in FIG. 7. $CPMV_k$ (k=1, 2, 3, 4) represents the k-th control point. For $CPMV_1$, the B2->B3->A2 blocks are checked and the MV of the first available block is used. For $CPMV_2$, the B1->B0 blocks are checked and for $CPMV_3$, the A1->A0 blocks are checked. For TMVP is used as $CPMV_4$ if it is available. The following combinations of control point MVs are used to construct in order: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}. The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

Zero MVs: After inherited affine merge candidates and constructed affine merge candidate are checked, if the list is still not full, zero MVs are inserted to the end of the list.

In some cases, the encoding device 104 and/or the decoding device 112 can perform adaptive reordering of merge candidates (ARMC), referred to as ECM ARMC. For example, in ECM, the merge candidates are adaptively reordered with TM. The reordering method can be applied to a regular merge candidate list, a TM merge candidate list, and/or an affine merge candidate list (the subblock merge candidate list excluding the SbTMVP candidate). For the TM merge mode, merge candidates are reordered before the TM refinement process.

After a merge candidate list is constructed, merge candidates are divided into several subgroups. The subgroup size is set to 5 for regular merge mode and TM merge mode. The subgroup size is set to 3 for affine merge mode. Merge candidates in each subgroup are reordered ascendingly according to cost values based on TM. In some examples, for simplification, merge candidates in the last but not the first subgroup are not reordered.

The TM cost of a merge candidate can be measured by the sum of absolute differences (SAD) (or other measurement) between samples of a template of the current block and their corresponding reference samples. The template comprises a set of reconstructed samples neighboring to the current block. Reference samples of the template are located by the motion information of the merge candidate.

Figure 8:
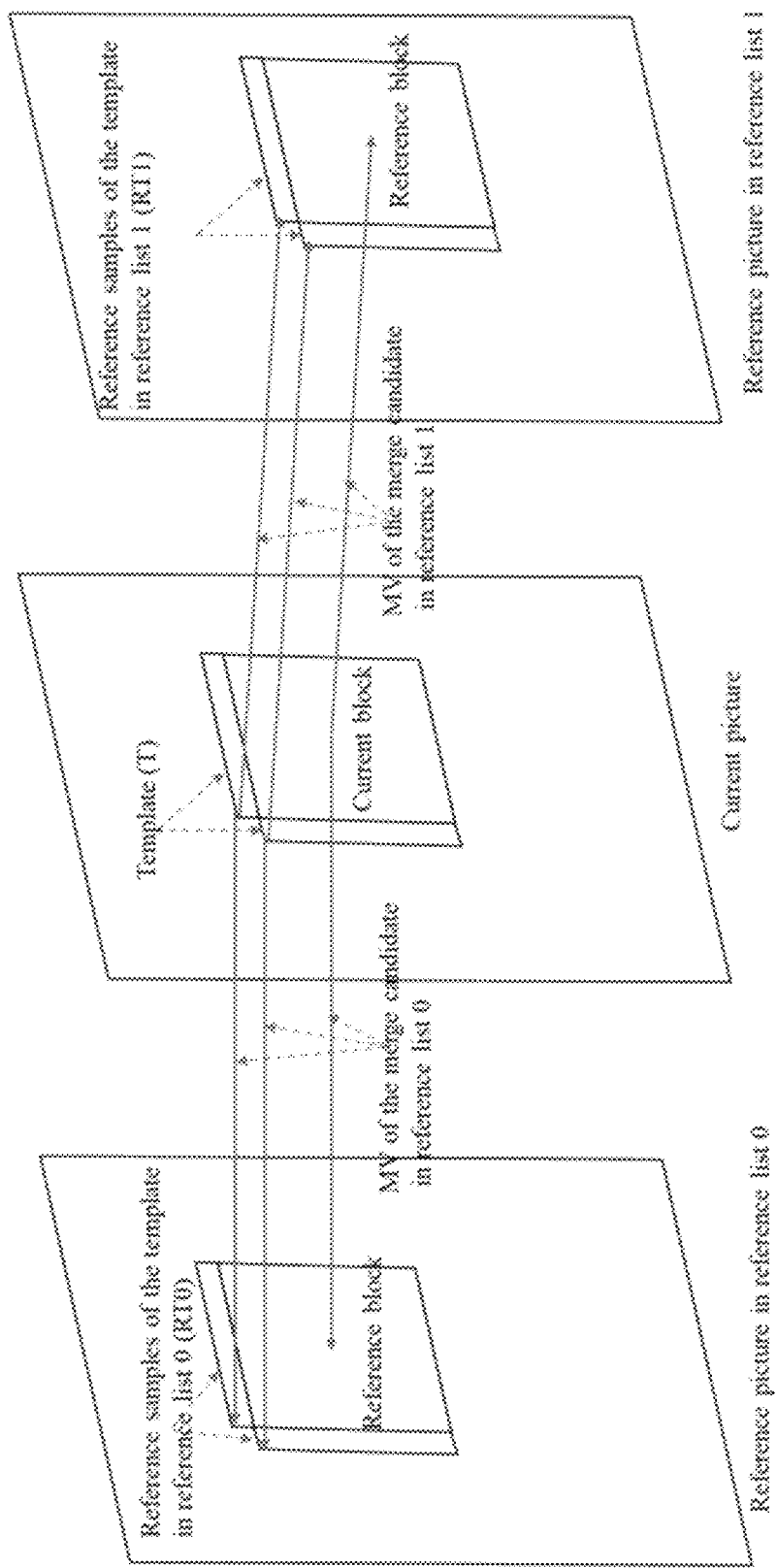
FIG. 8 is a diagram illustrating an example of template and reference samples of a template in reference pictures, in accordance with examples described herein.
Figure 9:
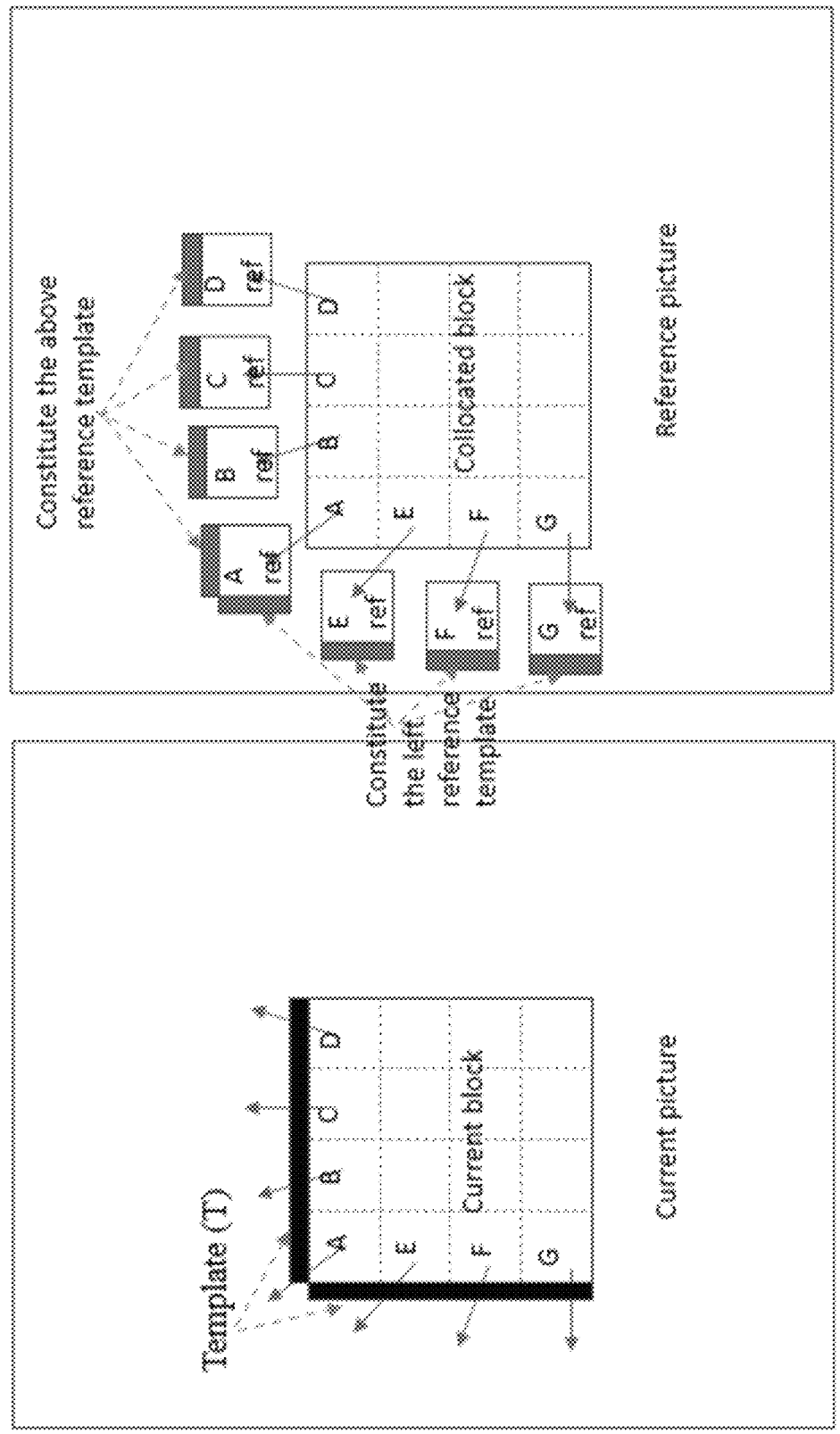
FIG. 9 is a diagram illustrating an example of template and reference samples of a template for a block with sub-block motion using motion information of the subblocks of a current block, in accordance with examples described herein.

When a merge candidate utilizes bi-directional prediction, the reference samples of the template of the merge candidate are also generated by bi-prediction as shown in FIG. 8. For subblock-based merge candidates with subblock size equal to Wsub×Hsub, the above template comprises several sub-templates with the size of Wsub×1, and the left template comprises several sub-templates with the size of 1×Hsub. As shown in FIG. 9, the motion information of the subblocks in the first row and the first column of current block is used to derive the reference samples of each sub-template.

Figure 10:
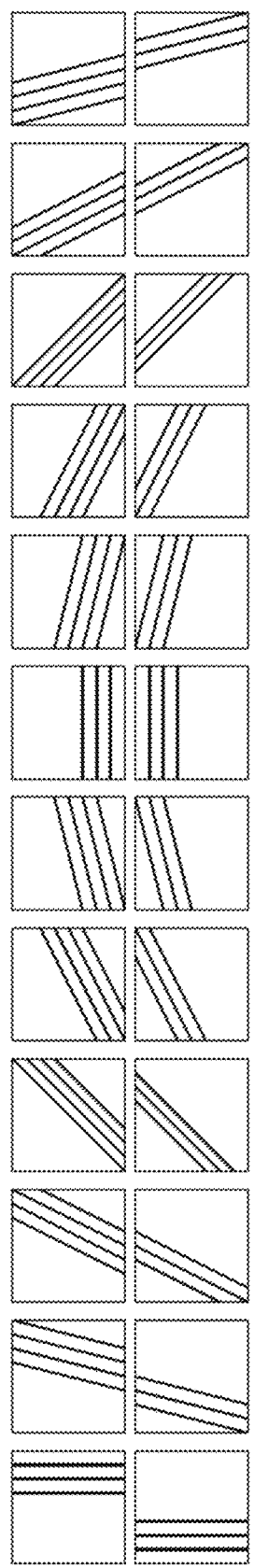
FIG. 10 is a diagram illustrating an example of splitting of a block into two parts by a geometrically located straight line, in accordance with examples described herein.

In some examples, the encoding device 104 and/or the decoding device 112 can generate a merge candidate list (e.g., a uni-prediction merge candidate list) for a geometric partitioning mode. For instance, in VVC, a geometric partitioning mode (which can be referred to as GEO mode) is supported for inter prediction. When GEO mode is used, a CU or other block can be split into two parts by a geometrically located straight line, such as shown in FIG. 10.

The location of the splitting line can be mathematically derived from the angle and offset parameters of a specific partition. Each part of a geometric partition in the CU is inter-predicted using its own motion; in some cases, only uni-prediction is allowed for each partition, in which case each part has one motion vector and one reference index.

Figure 11:
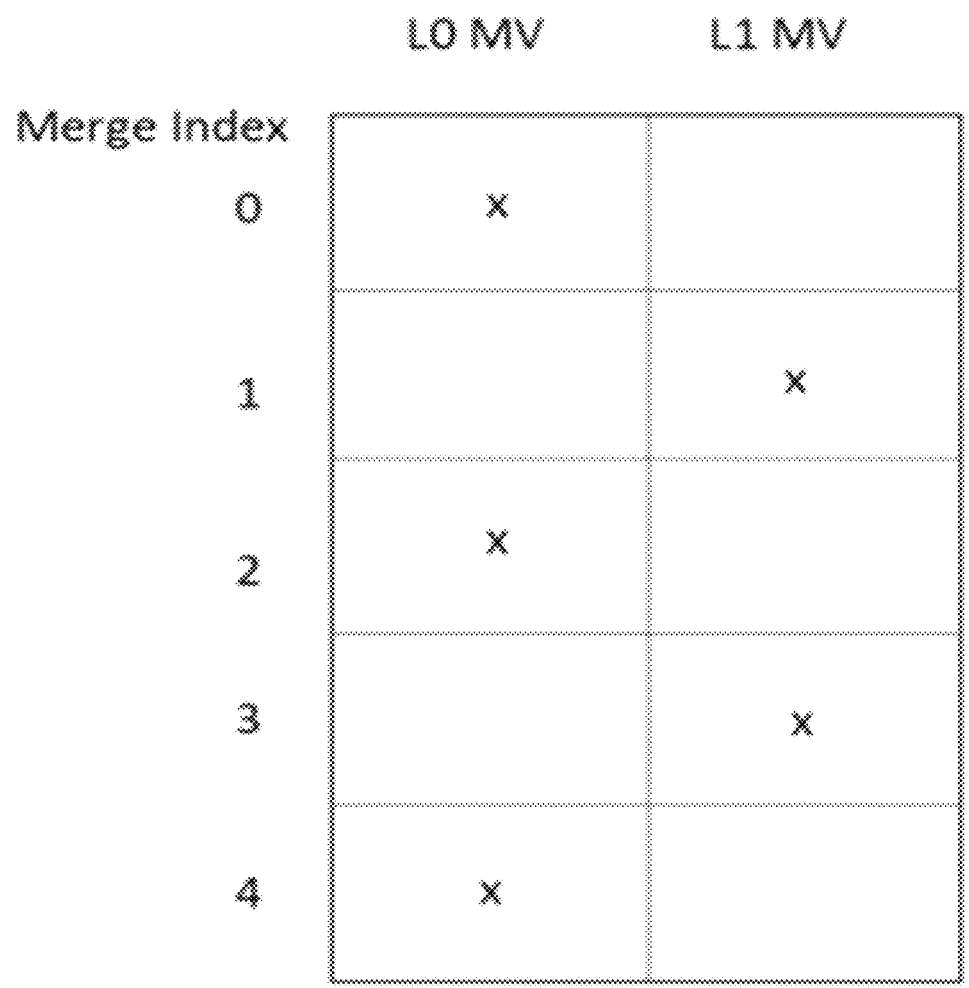
FIG. 11 is a diagram illustrating an example derivation of a uni-prediction candidate list for a geometric partitioning mode (GEO mode), in accordance with examples described herein.

The encoding device 104 and/or the decoding device 112 can derive the uni-prediction candidate list for GEO mode directly from the regular merge candidate list, as illustrated in FIG. 11. For example, denoting n as the index of the uni-prediction motion in the geometric uni-prediction candidate list, the LX motion vector of the n-th merge candidate, with X equal to the parity (even or odd) of n, is used as the n-th uni-prediction motion vector for geometric partitioning mode. These motion vectors are marked with "x" FIG. 11. In case a corresponding LX motion vector of the n-the extended merge candidate does not exist, the L(1−X) motion vector of the same candidate is used instead as the uni-prediction motion vector for geometric partitioning mode.

As noted above, the systems and techniques described herein can use a multi-stage ARMC (e.g., a two-stage ARMC) technique. Using a two-stage ARMC as an illustrative example, in a first ARMC stage, the encoding device 104 and/or the decoding device 112 can use a first grouping method for grouping the available candidates, and reordering may be applied within each group (e.g., reordering individually within each group). The encoding device 104 and/or the decoding device 112 can then construct a first merge candidate list in order by the groups that are processed by the first ARMC. The input to the second ARMC stage can include the first merge candidate list. In the second ARMC stage, the encoding device 104 and/or the decoding device 112 can use a second grouping method for grouping the candidates (e.g., from first merge candidate list). The encoding device 104 and/or the decoding device 112 can apply reordering within each group (e.g., reordering individually within each group) of the candidates generated by the second grouping method. The encoding device 104 and/or the decoding device 112 can then construct a second merge candidate list in order by the groups that are processed by the second ARMC. The systems and techniques described herein can be applied individually or in any combination.

In some examples, in the first ARMC, the last X number of candidates within each group (e.g., the last three candidates, the last two candidates, the last candidate, or other number of candidates) after reordering may be discarded to reduce the number of candidates when adding candidates to the first merge candidate list. The first grouping method may be different from the second grouping method or may be the same grouping method. The reordering criterion in the first ARMC may also be different from that in the second ARMC or may be the same reordering.

In one illustrative example, the first grouping method in the first ARMC is based on the candidate types (e.g., SMVP, TMVP, NA-TMVP, HMVP, SbTMVP, I-AffineMVP, and/or C-AffineMVP candidate types). In some cases, candidates in each type are reordered separately. A first merge candidate list can then be constructed (e.g., by the encoding device 104 and/or the decoding device 112) in a predefined order of candidate types. After the first merge candidate list is constructed, the encoding device 104 and/or the decoding device 112 can apply the second ARMC to the first merge candidate list to further group the candidates of the first merge candidate list. The candidates in each group may then be reordered. After the second ARMC processing is finished, the encoding device 104 and/or the decoding device 112 can construct a second merge candidate list, as described above. In some cases, the second merge candidate list is the final candidate list for a specific merge mode.

In another alternative or additional illustrative example, the second grouping method in the second ARMC is based on the candidate index. One illustrative example of the second ARMC is the ARMC currently used in ECM, such as the ECM ARMC described above. For instance, the first ARMC and the second ARMC may reorder the merge candidates according to the TM cost values, as described above with respect to the ECM ARMC.

In another alternative or additional illustrative example, the first ARMC and the second ARMC are implemented after a merge candidate list is constructed. For instance, after a merge candidate list is constructed, the first ARMC can include grouping the candidates based on the candidate types, and reordering the candidates in each candidate type. The merge candidate list reordered according to the first ARMC can be further grouped and reordered according to the second ARMC.

In some aspects, there are multi-stage ARMCs, where the grouping and reordering methods could be different in at least two of stages. In some examples, there are P1 ARMCs before the first merge candidate list is constructed, and there are P2 ARMCs after the first merge candidate list is constructed, where P1 and P2 are positive integers. In some cases, the proposed two-stage ARMC or multi-stage ARMC can be applied to the merge candidate list constructions in any merge mode, e.g., regular merge list, TM merge list, MMVD merge list, CIIP merge list, GPM merge list, sub-block merge list, etc.

Figure 15:
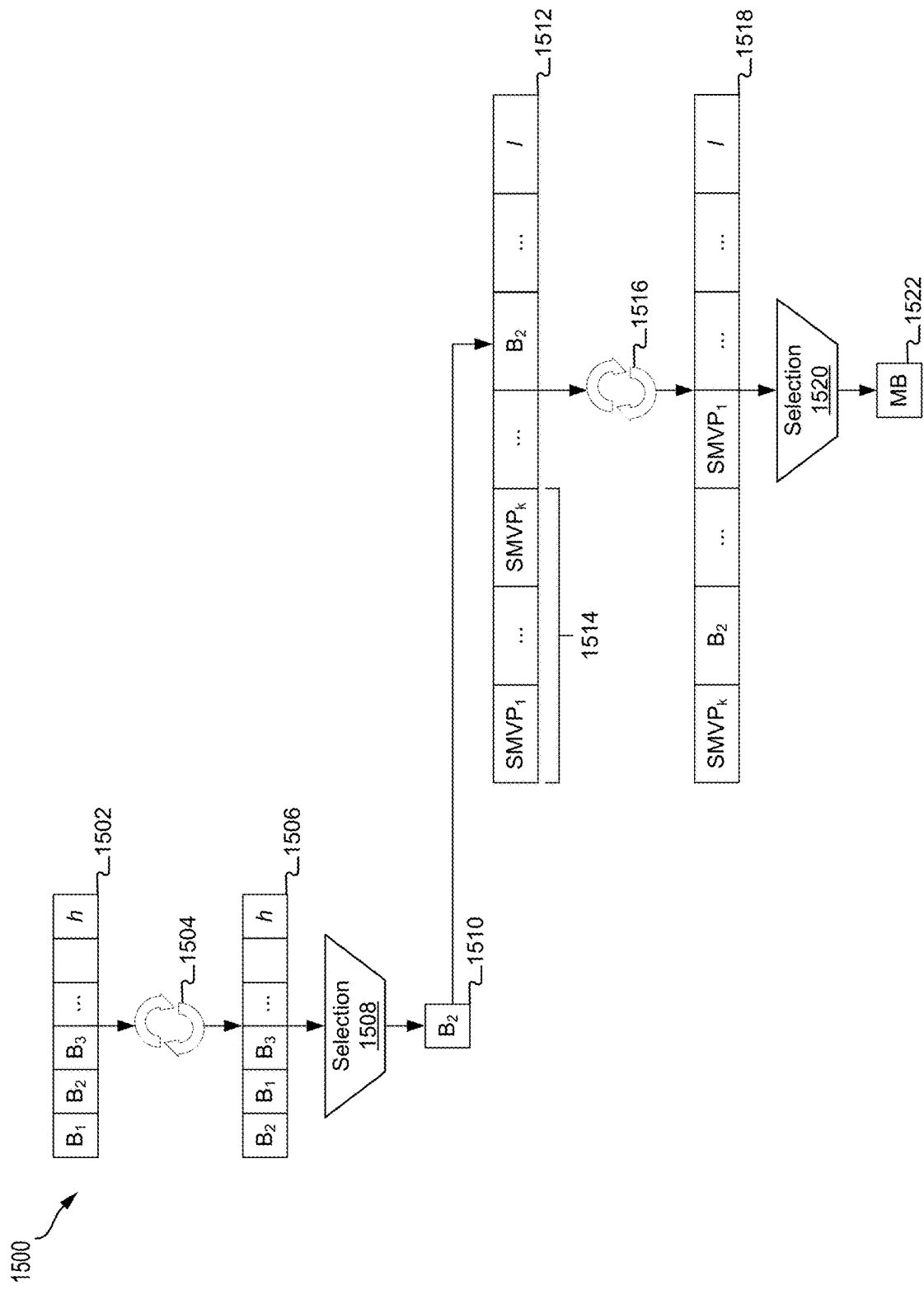
FIG. 15 is a block diagram illustrating an example of a multi-stage ARMC, in accordance with aspects of the present disclosure.

FIG. 15 is a block diagram illustrating an example of a multi-stage ARMC 1500, in accordance with aspects of the present disclosure. As indicated above, in some cases, the encoding device 104 and/or the decoding device 112 can utilize a merge mode that allows a block (e.g., an inter-predicted PU or other block) to inherit the same motion vector or vectors, prediction direction, and/or reference picture index or indices from another block (e.g., another inter-predicted PU or other block). This merge mode may be based on a merge candidate list. In some cases, a multi-stage ARMC, such as multi-stage ARMC 1500, may be used to select merge candidates for the merge candidate list. In this example, one or more grouping techniques may be applied to a set of prediction candidates (e.g., another inter-predicted PU or other block) to generate a group of prediction candidates 1502. For example, TMVP (as discussed below in detail) may be applied to a set of up to 30 TMVP prediction candidates to determine a group of prediction candidates including 9 prediction candidates (such as for the group of prediction candidates 1502). As another example, NA-SMVP (as discussed below in detail) may be applied to a set of up to 80 NA-SMVP prediction candidates to determine a group of 18 prediction candidates (such as the group of prediction candidates 1502).

The group of prediction candidates 1502 may be reordered 1504 as a reordered group of prediction candidates 1506. In some cases, the group of prediction candidates 1502 may be reordered 1504 based on ARMC TM cost values for prediction candidates of the group of prediction candidates 1502. From the reordered group of prediction candidates 1506, a merge candidate 1510 may be selected 1508. For example, a first prediction candidate from the reordered group of prediction candidates 1506 may be selected 1508 as the merge candidate 1510. This merge candidate 1510 may be added to a merge candidate list 1512 (e.g., second candidate list). In some cases, the merge candidate list 1512 may be a TM merge candidate list. In some cases, the merge candidate list 1512 may include other merge candidates 1514. The other merge candidates 1514 may be added to the merge candidate list 1512 via other grouping methods, such as SMVP. In some cases, the merge candidate list 1512 may include l number of merge candidates which are added to the merge candidate list 1512 via a grouping method such as the various candidate types discussed below. In some cases, the l may be 10. By obtaining a merge candidate via first stage ARMC such as via a grouping method, reordering, and selecting a prediction candidate, better merge candidates can be obtained. For example, rather than obtaining a TMVP candidate from two possible candidates (as shown in FIG. 4 and discussed above), the first stage ARMC allows the TMVP candidate to be selected from a broader range of prediction candidates. The selection process of the first stage ARMC also allows for a more predictive merge candidate to be selected, as compared to using whichever prediction candidate is available.

In some cases, the merge candidate 1510 may be checked against other merge candidates 1514 already in the merge candidate list 1512, and the merge candidate 1510 added if the merge candidate 1510 is not already in the merge candidate list 1512. If the merge candidate 1510 is already in the merge candidate list 1512, the merge candidate 1510 may be dropped and the merge candidate list 1512 zero padded.

In some cases, a second reordering method 1516 may be applied to the merge candidate list 1512 to generate a reordered merge candidate list 1518. For example, the merge candidate list 1512 may be reordered 1516 based on ARMC TM cost values for merge candidates of the merge candidate list 1512. A merge block 1522 may then be selected 1520 from the reordered merge candidate list 1518. For example, a first merge candidate may be selected from the reordered merge candidate list 1518.

In some illustrative examples, the first ARMC of the two-stage ARMC described herein groups candidates into multiple groups, and reorders N candidates in a group based on a cost criterion. In such an example, M candidates are selected out of N candidates, where M and N are positive integers and M≤N. After each group is processed by the first ARMC, a first merge candidate list is constructed in a predefined order of the groups.

In some cases, the first ARMC groups the candidates with the same candidate type in one group. For example, in regular merge mode, SMVP candidates are grouped into one group and three other candidate types (e.g., TMVP candidates, NA-TMVP candidates, and HMVP candidates) are separately grouped into three different groups. In some cases, the values of M and N may be different in different groups. In some cases, at least one of M and N may be different for difference CU sizes. For instance, for larger CU sizes there can be larger numbers of M or N. In some examples, N is the number of all candidates in the candidate type.

Figure 12:
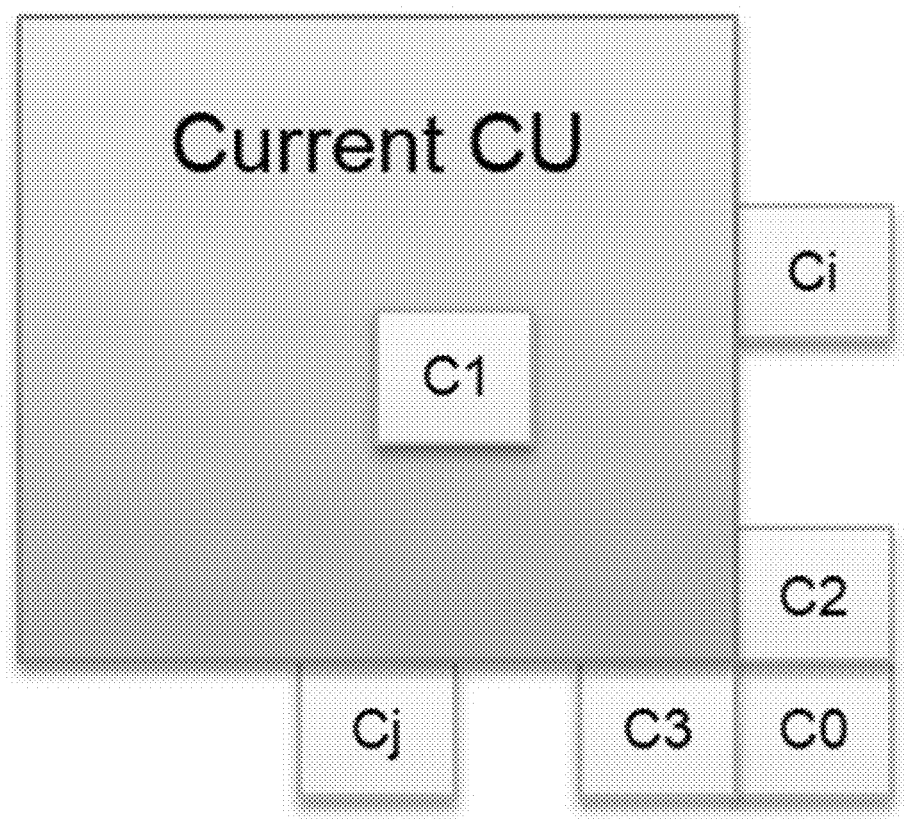
FIG. 12 is a diagram illustrating an example of positions of temporal motion vector prediction (TMVP) candidates, in accordance with examples described herein.

Illustrative examples of the first ARMC for various candidate types are described as follows:

TMVP reordering: For instance, M1 TMVP candidates can be selected out of reordered N1 TMVP candidates based on ARMC TM cost values, where M1≤N1. In some cases, 1 TMVP candidate may be selected out of a reordered 9 TMVP candidates. Denoting the i-th TMVP candidate as TMVPi, the N1 TMVP candidates are composed of the different positions in the collocated picture. Referring to FIG. 12 as an illustrative example, TMVPi derives the TMVP from the position Ci, and TMVPj derives the TMVP from the position Cj. Ci and Cj can be any positions adjacent to the current CU. In another illustrative example, the N1 TMVP candidates are composed of the different pairs of positions in the collocated picture; an example is TMVPi derives the TMVP from the pair of C2 and C3 and TMVPj derives the TMVP from the pair of Ci and Cj, where for a prediction list LX (e.g., X is equal to 0 or 1), if C2 in LX is available, then TMVPi in LX is derived from C2, otherwise, TMVPi in LX is derived from C3 if C3 in LX is available. If Ci in LX is available, then TMVPj in LX is derived from Ci, otherwise, TMVPj in LX is derived from Cj if Cj in LX is available.

In another illustrative example, the N1 TMVP candidates are composed of the same positions in different collocated pictures. For instance, TMVPi can be derived from a position Ci in collocated picture A, and TMVPj can be derived from the same position in collocated picture B.

Additionally or alternatively, in some examples, the N1 TMVP candidates include the same positions using different prediction lists. In one illustrative example, TMVP0 derives the TMVP from the pair of Ci and Cj, where for a prediction list LX (X is equal to 0 or 1), if Ci in LX is available, then TMVP0 in LX is derived from Ci; otherwise, TMVP0 in LX is derived from Cj if Cj in LX is available. In such an example, TMVP1 uses the prediction list 0 (L0), such as by deriving TMVP1 equal to the TMVP0 using L0 only (e.g., TMVP0 without L1). In such an example, TMVP2 uses the prediction list 1 (L1), such as by deriving TMVP2 equal to the TMVP0 using L1 only (e.g., TMVP0 without L0).

For example, a TMVP candidate may be constructed using a bi-prediction location where two motion vectors are used or uni-prediction location with a single motion vector is used. When a TMVP candidate is constructed, the location Ci may be checked and then the location Cj may be checked. Each of Ci and Cj may be bi-prediction or uni-prediction. If a MV prediction in a location is bi-prediction, there are two motion vectors in the location, one from L0 and one from L1. Similarly, if MV prediction is uni-prediction, there is one motion vector, either from L0 or from L1. In one illustrative example, 10 TMVP candidates may be constructed from 10 pairs of locations and these 10 TMVP candidates may be bi-prediction and/or uni-prediction candidates. In some cases, the TMVP candidates can be used to generate another set of TMVP candidates from L0 and another set of TMVP candidates from L1. For instance, continuing with the example from above, the 10 TMVP candidates can be used to generate another 10 TMVP candidates from L0 and another 10 TMVP candidates from L1 for a total of 30 possible prediction candidates. In some cases, the first 9 positions may be used for the group of prediction candidates (such as the group of prediction candidates 1502).

Additionally or alternatively, in some examples, the N1 TMVP candidates include the same positions using different scaling factors (e.g., a×tb/td), where a can be any non-zero values. In one illustrative example, TMVP0 derives the TMVP from the pair of Ci and Cj as described above using the scaling factor tb/td (a set as 1). In such an example, TMVP1 derives the TMVP from the pair of Ci and Cj as described above using the scaling factor (9/8)×(tb/td) (a set as 9/8). In such an example, TMVP2 derives the TMVP from the pair of Ci and Cj as described above using the scaling factor (1/8)×(tb/td) (a set as 1/8).

The above TMVP examples can be used individually or combined together in any form. In one example of a combination of the TMVP examples, the N1 TMVP candidates include different pairs of positions while using different prediction lists. For instance, in such an example, TMVP0 derives the TMVP from the pair of C0 and C1, where for a prediction list LX (X is equal to 0 or 1), if C0 in LX is available, then TMVP0 in LX is derived from C0; otherwise, TMVP0 in LX is derived from C1 if C1 in LX is available. In such an example, TMVP1 uses the prediction list 0 (L0), such as by deriving TMVP1 equal to the TMVP0 using L0 only (e.g., TMVP0 without L1). In such an example, TMVP2 uses the prediction list 1 (L1), such as by deriving TMVP2 equal to the TMVP0 using L1 only (e.g., TMVP0 without L0). In such an example, TMVP3 derives the TMVP from the pair of Ci and Cj, where for a prediction list LX (X is equal to 0 or 1), if Ci in LX is available, then TMVP3 in LX is derived from Ci; otherwise, TMVP3 in LX is derived from Cj if Cj in LX is available. Further in such an example, TMVP4 uses the prediction list 0 (L0), such as by deriving TMVP4 equal to the TMVP3 using L0 only (e.g., TMVP3 without L1). TMVP5 uses the prediction list 1 (L1), such as by deriving TMVP5 equal to the TMVP3 using L1 only (e.g., TMVP3 without L0). In another illustrative example of a combination of the TMVP examples, the N1 TMVP candidates include different pairs of positions while using different prediction lists and different scaling factors a×tb/td.

Figure 13:
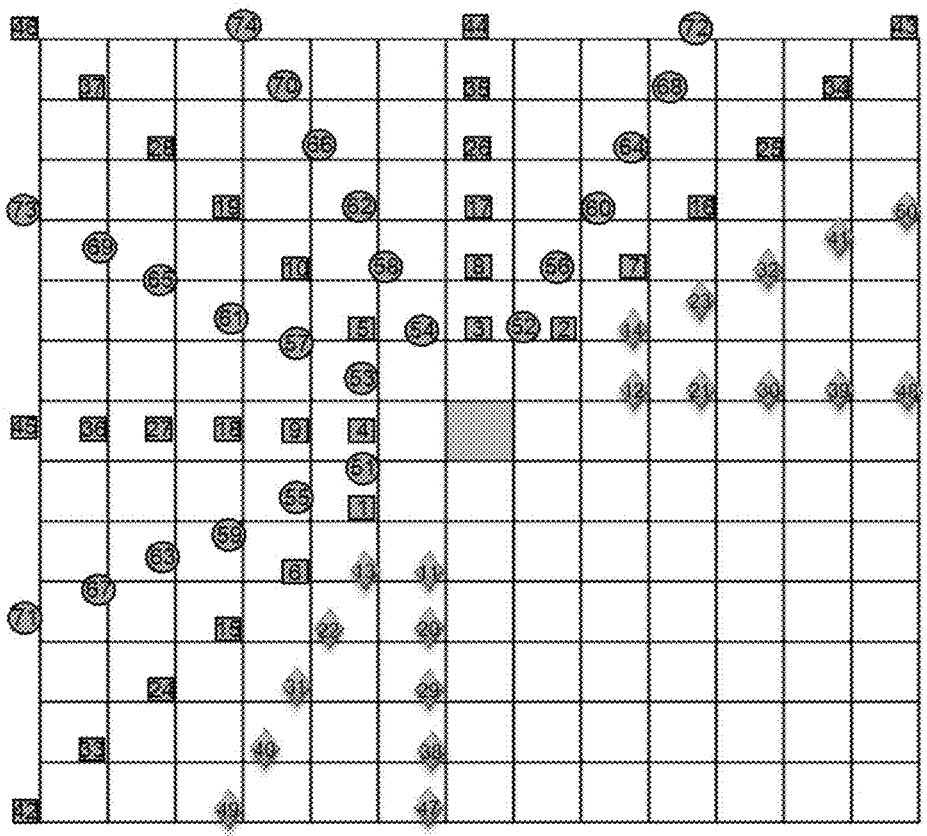
FIG. 13 is a diagram illustrating an example of non-adjacent spatial neighboring blocks used to derive non-adjacent (NA) motion vector predictors (MVPs), in accordance with examples described herein.

NA-SMVP reordering (also sometimes referred to as non-adjacent MVP): In one illustrative example, M2 NA-SMVP candidates can be selected out of reordered N2 NA-SMVP candidates based on ARMC TM cost values, where M2≤N2. N2 NA-SMVP candidates are composed of the MVs from spatially different neighboring blocks as shown in FIG. 5. Additionally or alternatively, in some aspects, neighboring blocks are composed of different position types. In one example, the type may be based on the geometric direction. For instance, referring to FIG. 13 as an illustrative example, blocks 53, 57, 61, 65, 69, 73 are in one direction, and blocks 51, 55, 59 63, 67, 71 are in another one direction. In another example, the type may be based on a geometric layer. Referring again to FIG. 13 as an illustrative example, blocks 47, 49, 42, 71, 45, 73, 46, 74, 44, 72, 43, 50, 48 are in one layer, and blocks 38, 40, 33, 67, 36, 69, 37, 70, 35, 68, 34, 41, 39 are in another one layer. The type may be based on any combination geometric direction, geometric layer, and/or other factors associated with the blocks. In some aspects, the positions are categorized into g1 groups based on a first position type, where g1 is a positive integer, and is larger than or equal to 2. In such aspects, each group may be further categorized into g2 subgroups based on a second position type, where g2 is a positive integer, and is larger than or equal to 2. N2 NA-SMVP candidates may then be constructed in the order of group 1, group 2, through the final group g1, and in each group i, NA-SMVP candidates are constructed in the order of subgroup 1, subgroup 2, through the final subgroup g2. Referring again to FIG. 13 as an illustrative example, the positions may be categorized into 2 groups (g1=2) based on the geometric direction, where square blocks from 5 geometric directions and diamond blocks from 4 geometric directions are categorized into group 1, and circle blocks forming 4 geometric directions are categorized into group 2, and each group is further categorized into 7 subgroups (g2=7) based on the geometric layer. Taking group 1 as an example, subgroup 1 includes 1, 4, 5, 3, and 2, subgroup 2 includes 11, 13, 6, 9, 10, 8, 7, 14, and 12, subgroup 3 includes 20, 22, 15, 18, 19, 17, 16, 23, and 21, and so on. In some cases, N2 NA-SMVP candidates are first constructed from the blocks in group 1. If N2 is not reached, the candidates from the blocks in group 2 are further added into the NA-SMVP candidates until N2 is reached. In group i, the NA-SMVP candidates are constructed in the order of subgroup 1, subgroup 2, through, subgroup 7, until N2 candidates are added into NA-SMVP list. In some cases, N2 may be 18 candidates.

SbTMVP reordering: For instance, M3 SbTMVP candidates can be selected out of reordered N3 SbTMVP candidates based on ARMC TM cost values, where M3≤N3. Denoting the i-th SbTMVP candidate as SbTMVPi, the N3 SbTMVP candidates are composed of the different motion shifts applied to the collocated picture. In one illustrative example, SbTMVPi applies the MV information of neighbouring block A1 in FIG. 6A to the current block's coordinates to obtain sub-CU-level motion information from the collocated picture, and SbTMVPj applies the MV information of neighbouring block B1 in FIG. 6A to the current block's coordinates to obtain sub-CU-level motion information from the collocated picture. In another example of SbTMVP reordering, the N3 SbTMVP candidates can be composed of the different motion shifts which are derived from the regular merge list, where regular merge list has been reordered by ARMC. In another example, SbTMVPi first performs SMVP reordering, where M3 SMVP candidates are selected out of reordered N10 SMVP candidates based on ARMC TM cost values, with M3≤N10. The i-th SMVP candidate(s) is/are composed of the MVs from different spatially neighboring blocks, such as shown in FIG. 2. The selected M3 SMVPs are then used to shift the collocated block in the current CU while performing SbTMVP. In one illustrative example, M3=1, indicating that one SMVP is selected out of the reordered N10 SMVP candidates. The one SMVP (according to M3=1) is used to shift the collocated block in the current CU while operating SbTMVP.

In some aspects, the same reordering method can be applied to SMVP, PA-MVP, I-AffineMVP, and C-AffineMVP to get a pre-defined number of candidates out of reordered candidates in a merge candidate type.

For example, assuming the size of TM merge candidate list is M4, N4 TM merge candidates can be derived first, where M4≤N4, and then N4 TM merge candidates are reordered by the second ARMC. In such an example, M4 TM merge candidates are selected out of N4 reordered TM merge candidates.

In another example, some candidate types, such as HMVP and SMVP, are not reordered by the first ARMC. In another example, some candidate types, such as TMVP, are reordered by the first ARMC in one merge list, such as regular merge list, but not reordered by the first ARMC in the other one merge list, such as TM merge list.

In another example, the first grouping method in the first ARMC is to group at least two of candidate types into one group. For instance, the encoding device 104 and/or the decoding device 112 can group HMVP and PA-MVP into one group. For instance, assuming there are X1 and X2 candidates in HMVP and PA-MVP, then X1+X2 candidates out of HMVP and PA-MVP are reordered by ARMC TM costs, and Y candidates are selected out of X1+X2 candidates, where Y≤X1+X2. Another one example is to group SMVP and PA-MVP into one group. Suppose there are X1 and X2 candidates in SMVP and PA-MVP. Then X1+X2 candidates out of SMVP and PA-MVP are reordered by ARMC TM costs, and Y candidates are selected out of X1+X2 candidates, where Y ≤X1+X2. In another illustrative example, only the best one PA-MVP candidate is selected out of X2 PA-MVP candidates reordered by the first ARMC, and this one PA-MVP candidate and X1 SMVP candidates are further reordered by the first ARMC. In another illustrative example, only the best one SMVP candidate is selected out of X1 SMVP candidates by the ARMC TM cost values, only the best one PA-MVP candidate is selected out of X2 PA-MVP candidates by the ARMC TM cost values, and then the best SMVP candidate and the best PA-MVP candidate are further compared by the ARMC TM cost value as follows: If TM cost value of the best PA-MVP candidate is smaller than the TM cost value of the best SMVP candidate, the candidate type order is {the best PA-MVP candidate, SMVP candidates}; otherwise, {SMVP candidates, the best PA-MVP candidate}. In another illustrative example, if the candidate type order is {the best PA-MVP candidate, SMVP candidates}, more PA-MVP candidates, e.g. N9 PA-MVP candidates, are constructed and added to the merge candidate list. In another illustrative example, N9 PA-MVP candidates can be reordered by the first ARMC, and M9 candidates are selected out of N9 PA-MVP candidates, where M9≤N9. In another illustrative example, if the candidate type order is {the best PA-MVP candidate, SMVP candidates}, an i-th merge candidate mergeCand_i, in at least one of the candidate types in the first ARMC, and/or the non-reordered group in the second ARMC, is replaced with a PA-MVP by averaging the best PA-MVP candidate and this candidate mergeCand_i, e.g., pairwiseAverage(mergeCand_i, the best PA-MVP candidate), where pairwiseAverage is operated as the same as the PA-MVP in current ECM. In another illustrative example, the MV information of an i-th merge candidate mergeCand_i in at least one of the candidate types in the first ARMC and/or the non-reordered group in the second ARMC are replaced with a PA-MVP by averaging the first SMVP candidate, the second SMVP candidate and this candidate mergeCand_i, e.g., pairwiseAverage(mergeCand_i, the first SMVP candidate, the second SMVP candidate), where the averaged motion vectors are calculated separately for each reference list, and the averaging is performed as long as at least two of MVs out of mergeCand_i, the first SMVP candidate, and the second SMVP candidate are available for this reference list.

In some cases, a pruning scheme or process can be applied to at least one candidate list in various candidate groups (e.g. TMVP, NA-SMVP, etc.) to remove redundant candidates. In one illustrative example, a pruning process may be applied while constructing a NA-SMVP candidate list with list size equal to N2. In such an example, the comparison can be performed for a candidate to be added to the NA-SMVP candidate list with the candidates already added to the NA-SMVP list. Based on the comparison result, the considered candidate may not be added to the NA-SMVP list. For instance, if the following conditions are true in at least one of the j-th candidates of a candidate list for a candidate group, e.g. NA-SMVP candidate list with the list size of N2, the i-th candidate is not added into the list:

1. If the same reference picture list (e.g., either L0 or L1) is used by the i-th candidate and the j-th candidate.
2. If the same reference picture list index is used by the i-th candidate and the j-th candidate.
3. If the absolute value of horizontal MV difference between the i-th candidate and the j-th candidate is not greater than a pre-defined MV difference threshold Tx, and the absolute value of vertical MV difference between the i-th candidate and the j-th candidate is not greater than the pre-defined MV difference threshold Ty (both L0 MVs and L1 MVs are checked), where Tx and Ty can be any positive pre-assigned value, such as ¼, ½, 1, and/or other value. The Tx and Ty values may be equal.

In some aspects, Tx and Ty are mode dependent. In one example, Tx1 and Ty1 for one merge mode and Tx2 and Ty2 for the other one merge mode are different while constructing an NA-SMVP list, where Tx0 is not equal to Tx2, and Ty1 is not equal to Tx2.

In some aspects, after the candidate reordering in the groups (such based on candidate types) by the first ARMC, a first merge candidate list is constructed, and there is no second ARMC applied to the first merge candidate list. In such aspects, the first merge candidate list is the final merge candidate list for the merge mode.

Figure 14:
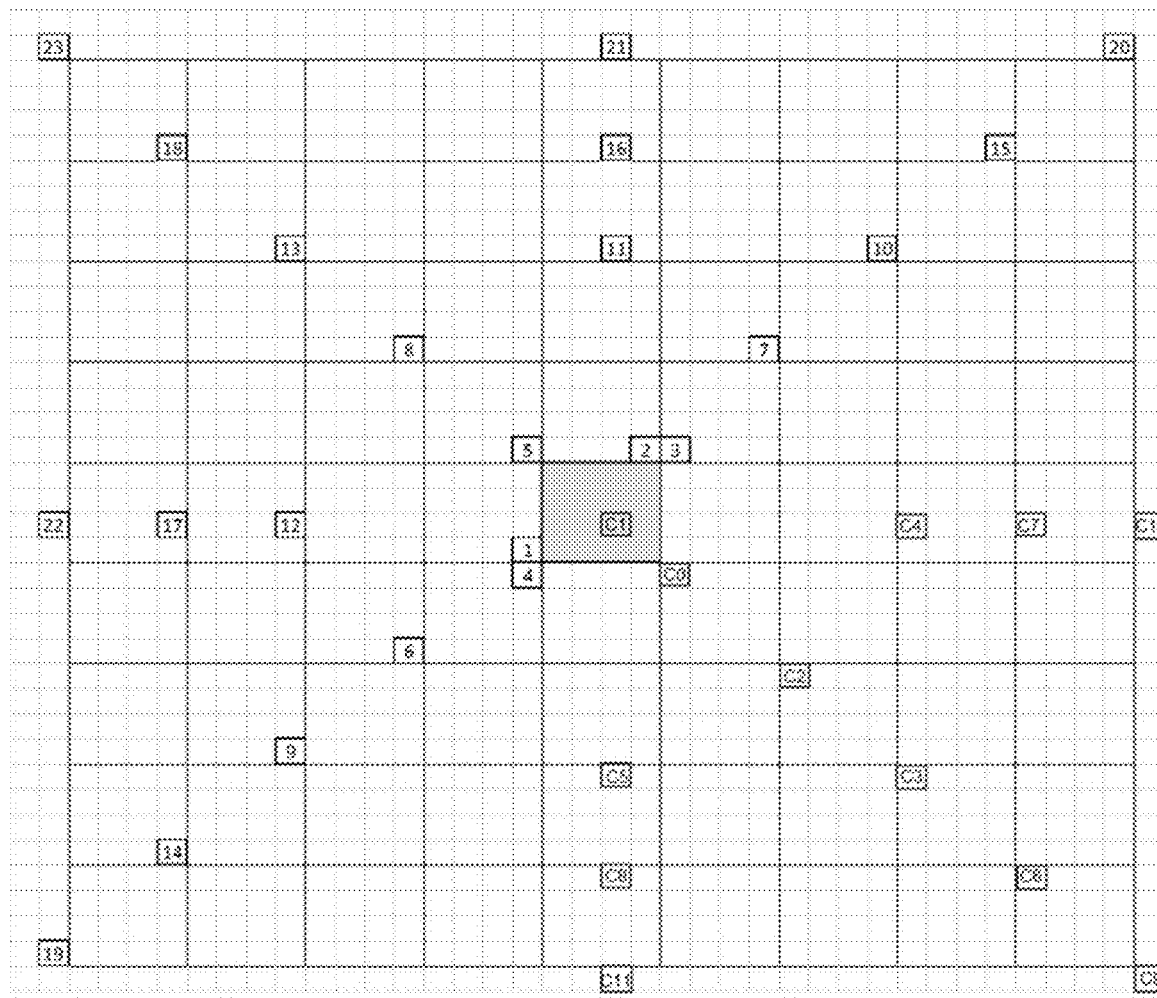
FIG. 14 is a diagram illustrating an example of TMVPs from non-adjacent collocated blocks (e.g., C2, C3, through C11), in accordance with examples described herein.

In some examples, the systems and techniques described herein include non-Adjacent TMVP. For instance, the encoding device 104 and/or the decoding device 112 can derive TMVPs from non-adjacent collocated blocks, and can add the TMVPs into the merge lists, such as a regular merge list and/or a TM merge list. FIG. 14 shows an example where block 1 to block 5 are used for SMVP, block 6 to block 23 are used for NA-SMVP, block C0 and block C1 are used for TMVP, and block C2 to block C11 are used for the proposed non-adjacent TMVP (NA-TMVP). Note that the pattern is not limited to be those as depicted in FIG. 14. One NA-TMVP candidate can use a block which is located at any position non-adjacent to the current CU.

In some cases, with respect to the order of candidate types in the merge lists, the encoding device 104 and/or the decoding device 112 can insert NA-TMVP candidate type into the merge lists between NA-SMVP candidate type and HMVP candidate type. In another example, the encoding device 104 and/or the decoding device 112 can insert NA-TMVP candidates into NA-SMVP candidates based on the distance to the current CU. For instance, NA-SMVP candidates and NA-TMVP candidates with the similar distance to the current CU are grouped together, and the group with shorter distances are ranked in higher priority to be inserted into a merge candidate list. Referring to FIG. 14 as an illustrative example, blocks 6, 7, 8 and C2 are in the first group, blocks 9, 10, 11, 12, 13, C3, C4, C5 are in the second group, blocks 14, 15, 16, 17, 18, C6, C7, C8 are in the third group, and blocks 19, 20, 21, 22, 23, C9, C10, C11 are in the fourth group. In some cases, the order of insertion into a merge candidate list is 1st group, 2nd group, 3rd group, and 4th group, and NA-SMVPs have higher priority than NA-TMVPs in a group.

In one example, denoting the i-th NA-TMVP candidate as NA-TMVPi, NA-TMVPi is derived from the position Ci. In another example, NA-TMVPi is derived from a pair of positions Cj and Ck. For instance, for a prediction list LX, if Cj in LX is available, then NA-TMVPi in LX is derived from Cj; otherwise, NA-TMVPi in LX is derived from Ck if Ck in LX is available.

In some aspects, the first ARMC stage described above can be applied to NA-TMVP. For instance, M5 NA-TMVP candidates may be selected out of reordered N5 NA-TMVP candidates based on ARMC TM cost values, where M5≤N5. In another example, NA-SMVP candidates and NA-TMVP candidates with the similar distance to the current CU are grouped into one group. For instance, assuming there are N6 candidates in this group, M6 candidates with M6≤N6 are selected out of reordered N6 candidates based on ARMC TM cost values.

In another example, NA-TMVP candidates can be inserted between TMVP candidates and NA-SMVP candidates. In such an example, TMVPs and NA-TMVPs can be grouped together and reordered together by the first ARMC stage.

In some aspects, when the candidates in a candidate group are from different distances, the candidates can be added into the list from near to far until the list is full. For example, the candidates in NA-SMVP candidate group are from different distances (e.g., from any one or more of the blocks 6, 7, through 23 in FIG. 14). Referring to FIG. 14 as an example, the blocks 6, 7, and 8 are on the same distance level 1, blocks 9, 10, 11, 12, and 13 are on the same distance level 2, blocks 14, 15, 16, 17, and 18 are on the same distance level 3, and blocks 19, 20, 21, 22, and 23 are on the same distance level 4. In one illustrative example, N2 is set as 18. In other examples, N2 can be set to any other suitable value. As indicated above, N2 is the NA-SMVP list size, N2 candidates in NA-SMVP list size will be reordered, and M2 NA-SMVP candidates with lowest TM costs will be selected out of the N2 candidates and added into the merge list. Then, N2 NA-SMVP candidates (e.g., N2=18) are added into the NA-SMVP candidate list from far to near (e.g., in the order of blocks 6, 7, 8, through 23). In some cases, the candidates in each distance level are further divided into Q1 subgroups, and the candidates are added into the list from near to far and from subgroup 1 to subgroup Q1 until the list is full. For example, if Q1 is set to be 2, the blocks 6 and 7 are set to be subgroup 1 on distance level 1, the block 8 is set to be subgroup 2 on distance level 1, the blocks 9, 10, 11, and 12 are set to be subgroup 1 on distance level 2, the block 13 is set to be subgroup 2 on distance level 2, the blocks 14, 15, 16, and 17 are set to be subgroup 1 on distance level 3, the block 18 is set to be subgroup 2 on distance level 3, the blocks 19, 20, 21, and 22 are set to be subgroup 1 on distance level 4, and the block 23 is set to be subgroup 2 on distance level 4. N2 NA-SMVP candidates (e.g., with N2=18) can then be added into the NA-SMVP candidate list from far to near and from subgroup 1 to subgroup Q1 (e.g., in the order of blocks 6, 7, 9, 10, 11, 12, 14, 15, 16, 17, 19, 20, 21, 22, and then 8, 13, 18, 23).

In some aspects, the encoding device 104 and/or the decoding device 112 can reorder the candidates of a GEO merge candidate list. For instance, the encoding device 104 and/or the decoding device 112 can construct a GEO merge candidate list independently from the regular merge candidate list. In one example, the encoding device 104 and/or the decoding device 112 can construct the GEO merge candidate list from at least one of the following candidate types: SMVP, TMVP, NA-SMVP, NA-TMVP, HMVP, and PA-MVP. In some cases, if a candidate is a bi-prediction candidate (generated based on bi-prediction), then the bi-prediction candidate is split into two uni-prediction candidates. Then, for each candidate type, an ARMC is applied to reorder the candidates in the candidate type based on the TM cost values. Using the SMVP candidate type in FIG. 2 as example, there are 5 blocks (including blocks B0, A0, B1, A1, and B2). If B0 is a bi-prediction candidate, then it is split into two SMVP candidates, one is SMVP0 which uses the MV information in prediction list 0 of block B0, and the other is SMVP1 which uses the MV information in prediction list 1 of block B0. If A0 is a uni-prediction candidate, then SMVP2 uses the MV information of block A0. In some examples, assuming N7 uni-prediction SMVP candidates are collected, M7 with M7≤N7 are selected out of reordered N7 candidates based on TM costs. In some casese, the same method can be applied to TMVP, NA-SMVP, NA-TMVP and HMVP.

In some examples, there are two independent GEO merge candidate lists, such as one for the geometric partition 0, and the other for geometric partition 1. In such examples, the list construction and ARMC can be applied to both lists. In some cases, there are multiple independent GEO merge candidate lists, where a GEO merge candidate list corresponds to a specific geometric partition angle and specific geometric partition index. When ARMC is applied to a GEO merge list, the TM cost can be calculated based on the templates which are predefined by an TM look-up table. Table 1 below shows an example of the TM look-up table, where only above template of the current CU in FIG. 8 is used to calculate the TM cost for the GEO merge list corresponding to the partition angle index 0 and the $1^{st}$ partition, and left and above templates of the current CU are used to calculate the TM cost for the GEO merge list corresponding to the partition angle index 0 and the $2^{nd}$ partition.

TABLE 1

A TM look-up table to calculate the TM cost for a GEO merge candidate list

| | Partition angle | | | | | | | | | |
|---|---|---|---|---|---|---|---|---|---|---|
| | 0 | 2 | 3 | 4 | 5 | 8 | 11 | 12 | 13 | 14 |
| 1st partition | A | A | A | A | L + A | L + A | L + A | L + A | A | A |
| 2nd partition | L + A | L + A | L + A | L | L | L | L | L + A | L + A | L + A |
| | Partition angle | | | | | | | | | |
| | 16 | 18 | 19 | 20 | 21 | 24 | 27 | 28 | 29 | 30 |
| 1st partition | A | A | A | A | L + A | L + A | L + A | L + A | A | A |
| 2nd partition | L + A | L + A | L + A | L | L | L | L | L + A | L + A | L + A |

In some examples, a GEO merge candidate list is constructed dependently from the regular merge candidate list, as described above with respect to the construction of a uni-prediction GEO merge candidate list. For instance, if a candidate in the regular merge list is bi-prediction, then the encoding device 104 and/or the decoding device 112 can split one bi-prediction candidate into two uni-prediction candidates, and an ARMC can be applied to select the one uni-prediction candidate out of these two uni-prediction candidates based on the ARMC TM cost values.

Figure 16:
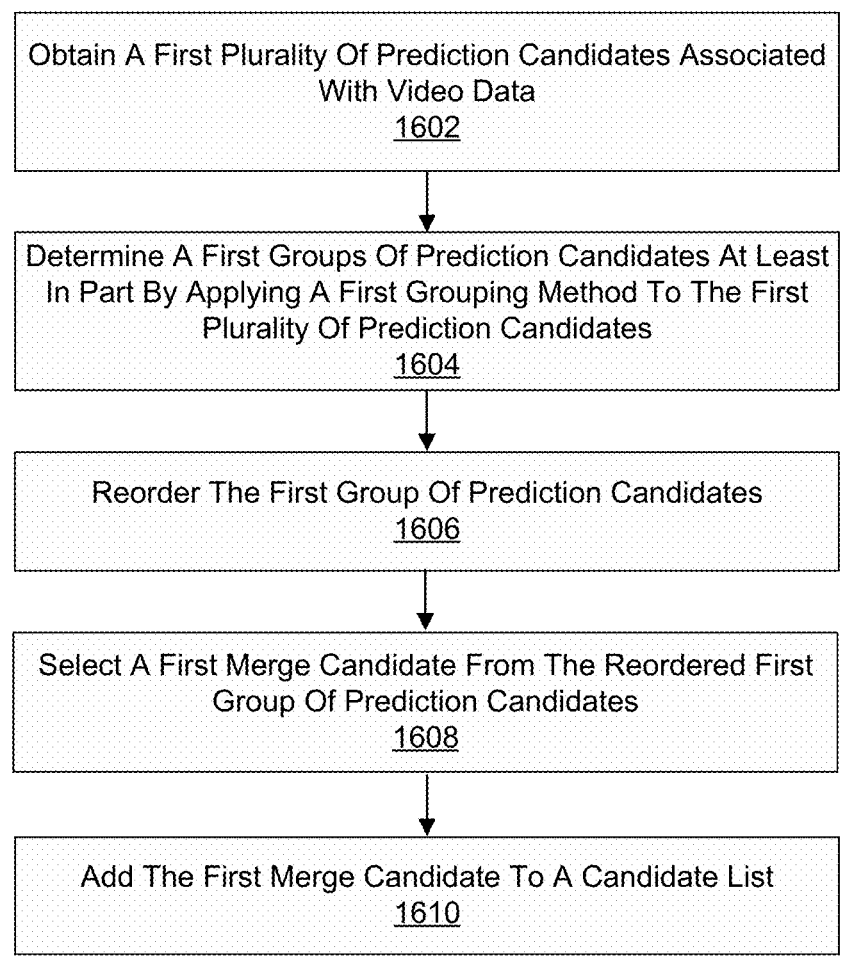
FIG. 16 is a flow diagram illustrating a technique for performing bit rate estimation, in accordance with aspects of the present disclosure.

FIG. 16 is a flow diagram illustrating a process 1600 for performing bit rate estimation 1600, in accordance with aspects of the present disclosure. At operation 1602, the process 1600 includes obtaining a first plurality of prediction candidates associated with video data. In some cases, at least one camera configured to capture one or more frames associated with the video data. At operation 1604, the process 1600 includes determining a first group of prediction candidates at least in part by applying a first grouping method to the first plurality of prediction candidates. In some cases, the first grouping method is based on a plurality of candidate types associated with the first plurality of prediction candidates. In some cases, the candidate list includes the first merge candidate in a predefined order based on the plurality of candidate types. In some cases, the plurality of candidate types include at least one of a spatial motion vector predictor (SMVP) type, a temporal motion vector predictor (TMVP) type, a non-adjacent temporal motion vector predictor (NA-TMVP) candidate, a history-based motion vector predictor (HMVP) candidate, a subblock-based temporal motion vector prediction (SbTMVP) candidate, an inherited affine merge (I-Affine-MVP) candidate, or a constructed affine merge (C-Affine-MVP) candidate. In some cases, the first grouping method is one of a temporal motion vector predictor (TMVP) or a non-adjacent temporal motion vector predictor (NA-TMVP). In some cases, the first group of prediction candidates includes fewer prediction candidates than the first plurality of prediction candidates.

At operation 1606, the process 1600 includes reordering the first group of prediction candidates. In some cases, the process 1600 includes reordering the first group of prediction candidates based on cost values. In some cases, the process 1600 includes reordering the first group of prediction candidates in ascending order based on the cost values. In some cases, the cost values are based on template matching. In some cases, the process 1600 includes discarding at least one candidate from the reordered first group of prediction candidates prior to adding the first merge candidate to the candidate list.

At operation 1608, the process 1600 includes selecting a first merge candidate from the reordered first group of prediction candidates. At operation 1610, the technique 1600 includes adding the first merge candidate to a candidate list. In some cases, the candidate list is a merge candidate list used for a merge mode. In some cases, the process 1600 includes determining a second group of prediction candidates at least in part by applying a second grouping method to the candidate list. In some cases, the process 1600 includes: reordering the second group of prediction candidates; selecting a second merge candidate from the reordered second group of prediction candidates; and adding the second merge candidate to the candidate list. In some cases, the process 1600 includes determining that the first merge candidate is not in the candidate list; and adding the first merge candidate to the candidate list based on the determination that the first merge candidate is not in the candidate list.

In some cases, the process 1600 includes generating a prediction for a current block of the video data based on the candidate list. In some cases, the process 1600 includes decoding the current block of the video data based on the prediction. In some cases, the process 1600 includes encoding the current block of the video data based on the prediction. In some cases, the process 1600 includes displaying images from the video data.

In some examples, the processes described herein may be performed by a computing device or an apparatus, such as the encoding device 104, the decoding device 112, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., the system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. The connection may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of the disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of the disclosure are performed by a video encoding device, the techniques may also be performed by a video encoder/decoder, typically referred to as a "CODEC." Moreover, the techniques of the disclosure may also be performed by a video preprocessor. Source device and destination device are merely examples of such coding devices in which source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in the disclosure may be applicable to video coding in general, and may be applied to wireless and/or wired applications. In each case, the captured, pre-captured, or computer-generated video may be encoded by the video encoder. The encoded video information may be output by an output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various examples of the application have been described.

Figure 17:
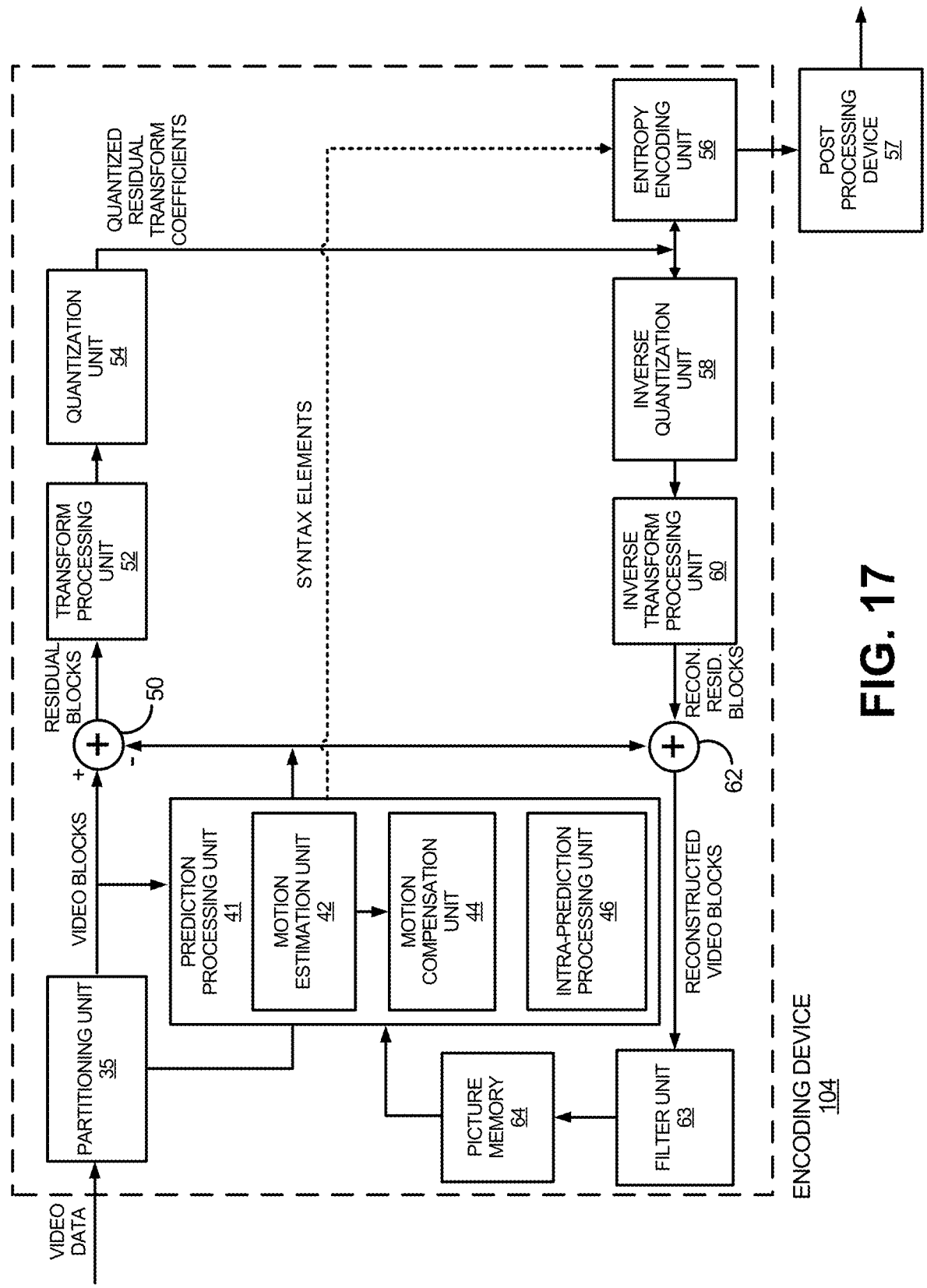
FIG. 17 is a block diagram illustrating a video encoding device, in accordance with some examples.
Figure 18:
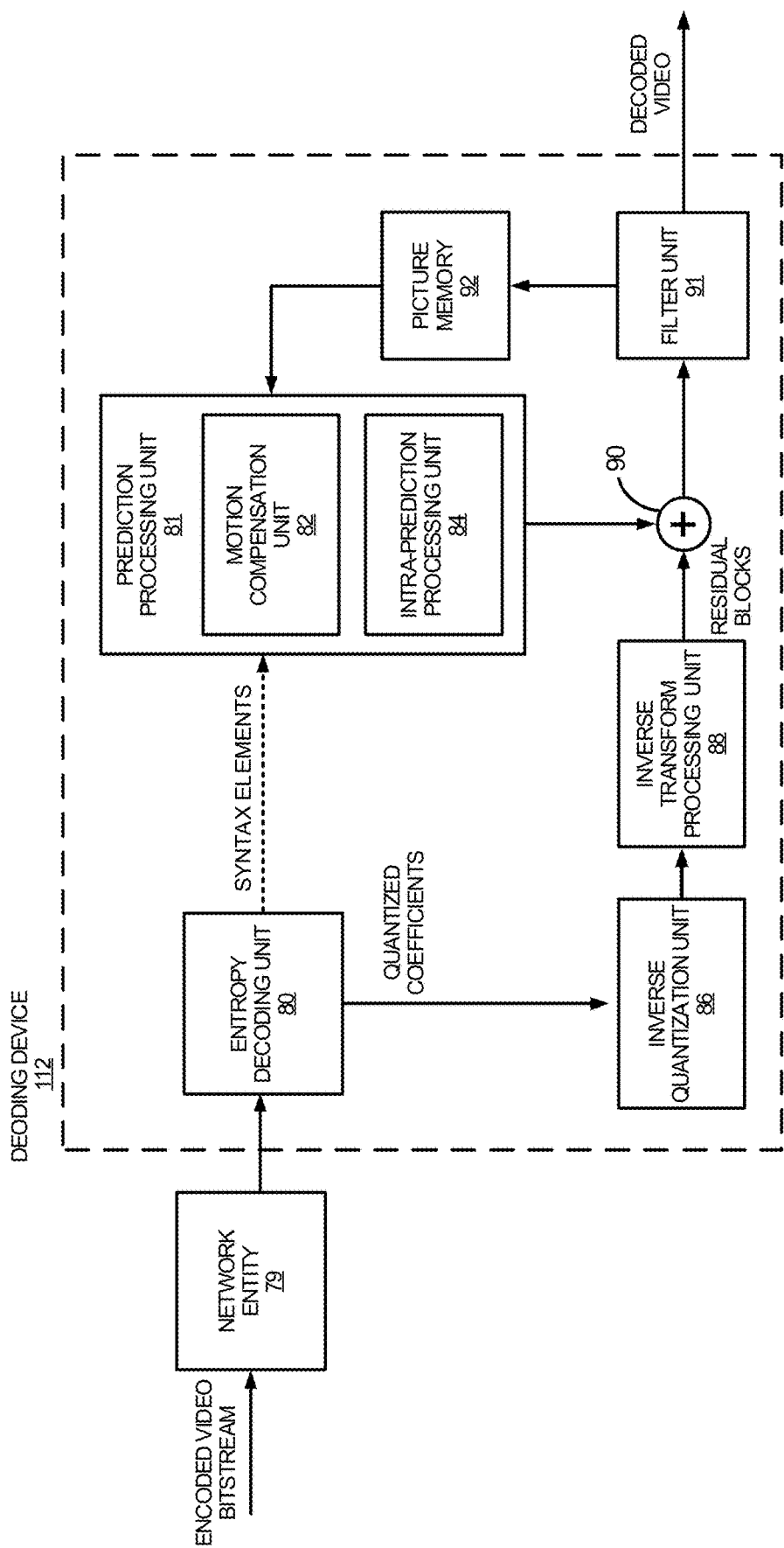
FIG. 18 is a block diagram illustrating a video decoding device, in accordance with some examples.

Specific details of the encoding device 104 and the decoding device 112 are shown in FIG. 17 and FIG. 18 respectively. FIG. 17 is a block diagram illustrating an example encoding device 104 that may implement one or more of the techniques described in the disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 17 as being an in loop filter, in other configurations, filter unit 63 may be implemented as a post loop filter. A post processing device 57 may perform additional processing on encoded video data generated by the encoding device 104. The techniques of the disclosure may in some instances be implemented by the encoding device 104. In other instances, however, one or more of the techniques of the disclosure may be implemented by post processing device 57.

As shown in FIG. 17, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform the subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

The encoding device 104 may perform any of the techniques described herein. Some techniques of the disclosure have generally been described with respect to the encoding device 104, but as mentioned above, some of the techniques of the disclosure may also be implemented by post processing device 57.

The encoding device 104 of FIG. 17 represents an example of a video encoder configured to perform one or more of the transform coding techniques described herein. The encoding device 104 may perform any of the techniques described herein, including the processes described above with respect to FIG. 18.

FIG. 18 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 17.

During the decoding process, the decoding device 112 receives an encoded video bitstream that represents video blocks of an encoded video slice and associated syntax elements sent by the encoding device 104. In some examples, the decoding device 112 may receive the encoded video bitstream from the encoding device 104. In some examples, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in the disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In the above case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform the summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 18 as being an in loop filter, in other configurations, filter unit 91 may be implemented as a post loop filter. The decoded video blocks in a given frame or picture are stored in picture memory 92, which stores reference pictures used for subsequent motion compensation. Picture memory 92 also stores decoded video for later presentation on a display device, such as video destination device 122 shown in FIG. 1.

The decoding device 112 of FIG. 18 represents an example of a video decoder configured to perform one or more of the transform coding techniques described herein.

The decoding device 112 may perform any of the techniques described herein, including the process 1900 described above with respect to FIG. 18.

In the foregoing description, aspects of the application are described with reference to specific examples thereof, but those skilled in the art will recognize that the subject matter of the application is not limited thereto. Thus, while illustrative examples of the application have been described in detail herein, it is to be understood that the concepts described herein may be otherwise variously embodied and employed, and that the appended claims are intended to be construed to include such variations, except as limited by the prior art. Various features and aspects of the above-described subject matter may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of the description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in the disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for processing video data, the apparatus comprising: at least one memory; and at least one processor coupled to the at least one memory, the at least one processor being configured to: obtain a first plurality of prediction candidates associated with video data; generate one or more first groups of prediction candidates at least in part by applying a first grouping method to the first plurality of prediction candidates; reorder the one or more first groups of prediction candidates; generate a first candidate list based on the reordered one or more first groups of prediction candidates; and generate one or more second groups of prediction candidates at least in part by applying a second grouping method to the first candidate list.

Aspect 2: The apparatus of Aspect 1, wherein the at least one processor is configured to: reorder the one or more second groups of prediction candidates; and generate a second candidate list based on the reordered one or more second groups of prediction candidates.

Aspect 3: The apparatus of any of Aspects 1 or 2, wherein the second candidate list is a merge candidate list used for a merge mode.

Aspect 4: The apparatus of any of Aspects 1 to 3, wherein the first grouping method is based on a plurality of candidate types associated with the first plurality of prediction candidates.

Aspect 5: Aspect The apparatus of Aspect 4, wherein, to generate the first candidate list, the at least one processor is configured to include in the first candidate list the reordered one or more first groups of prediction candidates in a predefined order based on the plurality of candidate types.

Aspect 6: The apparatus of any of Aspects 4 or 5, wherein the plurality of candidate types include at least one of a spatial motion vector predictor (SMVP) type, a temporal motion vector predictor (TMVP) type, a non-adjacent temporal motion vector predictor (NA-TMVP) candidate, a history-based motion vector predictor (HMVP) candidate, a subblock-based temporal motion vector prediction (SbTMVP) candidate, an inherited affine merge (I-Affine-MVP) candidate, and a constructed affine merge (C-Affine-MVP) candidate.

Aspect 7: The apparatus of any of Aspects 2 to 6, wherein the second grouping method is based on a candidate index.

Aspect 8: The apparatus of any of Aspects 1 to 7, wherein the at least one processor is configured to reorder the one or more first groups of prediction candidates based on cost values.

Aspect 9: The apparatus of Aspect 8, wherein the at least one processor is configured to reorder the one or more first groups of prediction candidates in ascending order based on the cost values.

Aspect 10: The apparatus of any of Aspects 8 or 9, wherein the cost values are based on template matching.

Aspect 11: The apparatus of any of Aspects 1 to 10, wherein the at least one processor is configured to: discard at least candidate from the reordered one or more first groups of prediction candidates prior to generating the first candidate list.

Aspect 12: The apparatus of any of Aspects 2 to 11, wherein the at least one processor is configured to: generate a prediction for a current block of the video data based on the second candidate list.

Aspect 13: The apparatus of Aspect 12, wherein the at least one processor is configured to: decode the current block of the video data based on the prediction.

Aspect 14: The apparatus of Aspect 12, wherein the at least one processor is configured to: encode the current block of the video data based on the prediction.

Aspect 15: The apparatus of any of Aspects 1 to 14, further comprising: a display device coupled to the at least one processor and configured to display images from the video data.

Aspect 16: The apparatus of any of Aspects 1 to 15, further comprising: one or more wireless interfaces coupled to the at least one processor, the one or more wireless interfaces comprising one or more baseband processors and one or more transceivers.

Aspect 17: The apparatus of any of Aspects 1 to 16, further comprising: at least one camera configured to capture one or more frames associated with the video data.

Aspect 18: A method of coding video data, the method comprising: obtaining a first plurality of prediction candidates associated with video data; generating one or more first groups of prediction candidates at least in part by applying a first grouping method to the first plurality of prediction candidates; reordering the one or more first groups of prediction candidates; generating a first candidate list based on the reordered one or more first groups of prediction candidates; and generating one or more second groups of prediction candidates at least in part by applying a second grouping method to the first candidate list.

Aspect 19: The method of Aspect 18, further comprising: reordering the one or more second groups of prediction candidates; and generating a second candidate list based on the reordered one or more second groups of prediction candidates.

Aspect 20: The method of any of Aspects 18 or 19, wherein the second candidate list is a merge candidate list used for a merge mode.

Aspect 21: The method of any of Aspects 18 to 20, wherein the first grouping method is based on a plurality of candidate types associated with the first plurality of prediction candidates.

Aspect 22: The method of Aspect 21, wherein generating the first candidate list includes adding to the first candidate list the reordered one or more first groups of prediction candidates in a predefined order based on the plurality of candidate types.

Aspect 23: The method of any of Aspects 21 or 22, wherein the plurality of candidate types include at least one of a spatial motion vector predictor (SMVP) type, a temporal motion vector predictor (TMVP) type, a non-adjacent temporal motion vector predictor (NA-TMVP) candidate, a history-based motion vector predictor (HMVP) candidate, a subblock-based temporal motion vector prediction (SbTMVP) candidate, an inherited affine merge (I-Affine-MVP) candidate, and a constructed affine merge (C-Affine-MVP) candidate.

Aspect 24: The method of any of Aspects 19 to 23, wherein the second grouping method is based on a candidate index.

Aspect 25: The method of any of Aspects 18 to 24, wherein the one or more first groups of prediction candidates are reordered based on cost values.

Aspect 26: The method of Aspect 25, wherein the one or more first groups of prediction candidates are reordered in ascending order based on the cost values.

Aspect 27: The method of any of Aspects 25 or 26, wherein the cost values are based on template matching.

Aspect 28: The method of any of Aspects 18 to 27, further comprising: discarding at least candidate from the reordered one or more first groups of prediction candidates prior to generating the first candidate list.

Aspect 29: The method of any of Aspects 19 to 28, further comprising: generating a prediction for a current block of the video data based on the second candidate list.

Aspect 30: The method of Aspect 29, further comprising: decoding the current block of the video data based on the prediction.

Aspect 31: The method of Aspect 29, further comprising: encoding the current block of the video data based on the prediction.

Aspect 32: A non-transitory computer-readable storage medium comprising instructions stored thereon which, when executed by one or more processors, cause the one or more processors to perform operations according to any of Aspects 1 to 31.

Aspect 33: An apparatus for processing video data, comprising one or more means for performing operations according to any of Aspects 1 to 31.

Aspect 32: A non-transitory computer-readable storage medium comprising instructions stored thereon which, when executed by one or more processors, cause the one or more processors to perform operations according to any of Aspects 1 to 31.

Aspect 33: An apparatus for processing video data, comprising one or more means for performing operations according to any of Aspects 1 to 31.

Aspect 34: An apparatus for processing video data, the apparatus comprising: at least one memory; and at least one processor coupled to the at least one memory, the at least one processor being configured to: obtain a first plurality of prediction candidates associated with video data; determine a first group of prediction candidates at least in part by applying a first grouping method to the first plurality of prediction candidates; reorder the first group of prediction candidates; select a first merge candidate from the reordered first group of prediction candidates; and add the first merge candidate to a candidate list.

Aspect 35: The apparatus of claim 34, wherein the at least one processor is configured to determine a second group of prediction candidates at least in part by applying a second grouping method to the candidate list.

Aspect 36: The apparatus of claim 35, wherein the at least one processor is configured to: reorder the second group of prediction candidates; select a second merge candidate from the reordered second group of prediction candidates; and add the second merge candidate to the candidate list.

Aspect 37: The apparatus of claim 34, wherein the candidate list is a merge candidate list used for a merge mode.

Aspect 38: The apparatus of claim 34, wherein the at least one processor is configured to: determine that the first merge candidate is not in the candidate list; and add the first merge candidate to the candidate list based on the determination that the first merge candidate is not in the candidate list.

Aspect 39: The apparatus of claim 34, wherein the first grouping method is based on a plurality of candidate types associated with the first plurality of prediction candidates.

Aspect 40: The apparatus of claim 39, wherein the candidate list includes the first merge candidate in a predefined order based on the plurality of candidate types.

Aspect 41: The apparatus of claim 40, wherein the plurality of candidate types include at least one of a spatial motion vector predictor (SMVP) type, a temporal motion vector predictor (TMVP) type, a non-adjacent temporal motion vector predictor (NA-TMVP) candidate, a history-based motion vector predictor (HMVP) candidate, a sub-block-based temporal motion vector prediction (SbTMVP) candidate, an inherited affine merge (I-AffineMVP) candidate, or a constructed affine merge (C-AffineMVP) candidate.

Aspect 42: The apparatus of claim 34, wherein the first grouping method is one of a temporal motion vector predictor (TMVP) or a non-adjacent temporal motion vector predictor (NA-TMVP).

Aspect 43: The apparatus of claim 34, wherein the at least one processor is configured to reorder the first group of prediction candidates based on cost values.

Aspect 44: The apparatus of claim 43, wherein the at least one processor is configured to reorder the first group of prediction candidates in ascending order based on the cost values.

Aspect 45: The apparatus of claim 43, wherein the cost values are based on template matching.

Aspect 46: The apparatus of claim 34, wherein the at least one processor is configured to discard at least one candidate from the reordered first group of prediction candidates prior to adding the first merge candidate to the candidate list.

Aspect 47: The apparatus of claim 34, wherein the at least one processor is configured to: generate a prediction for a current block of the video data based on the candidate list.

Aspect 48: The apparatus of claim 47, wherein the at least one processor is configured to: decode the current block of the video data based on the prediction.

Aspect 49: The apparatus of claim 47, wherein the at least one processor is configured to: encode the current block of the video data based on the prediction.

Aspect 50: The apparatus of claim 34, further comprising: a display device coupled to the at least one processor and configured to display images from the video data.

Aspect 51: The apparatus of claim 34, further comprising: one or more wireless interfaces coupled to the at least one processor, the one or more wireless interfaces comprising one or more baseband processors and one or more transceivers.

Aspect 52: The apparatus of claim 34, further comprising: at least one camera configured to capture one or more frames associated with the video data.

Aspect 53: The apparatus of claim 34, wherein the first group of prediction candidates includes fewer prediction candidates than the first plurality of prediction candidates.

Aspect 54: A method of coding video data, the method comprising: obtaining a first plurality of prediction candidates associated with video data; determining a first group of prediction candidates at least in part by applying a first grouping method to the first plurality of prediction candidates; reordering the first group of prediction candidates; selecting a first merge candidate from the reordered first group of prediction candidates; and adding the first merge candidate to a candidate list.

Aspect 55: The method of claim 54, further comprising determining a second group of prediction candidates at least in part by applying a second grouping method to the candidate list.

Aspect 56: The method of claim 55, further comprising: reordering the second group of prediction candidates; selecting a second merge candidate from the reordered second group of prediction candidates; and adding the second merge candidate to the candidate list.

Aspect 57: The method of claim 54, wherein the candidate list is a merge candidate list used for a merge mode.

Aspect 58: The method of claim 54, further comprising: determining that the first merge candidate is not in the candidate list; and adding the first merge candidate to the candidate list based on the determination that the first merge candidate is not in the candidate list.

Aspect 59: The method of claim 54, wherein the first grouping method is based on a plurality of candidate types associated with the first plurality of prediction candidates.

Aspect 60: The method of claim 59, wherein the candidate list includes the first merge candidate in a predefined order based on the plurality of candidate types.

Aspect 61: The method of claim 60, wherein the plurality of candidate types include at least one of a spatial motion vector predictor (SMVP) type, a temporal motion vector predictor (TMVP) type, a non-adjacent temporal motion vector predictor (NA-TMVP) candidate, a history-based motion vector predictor (HMVP) candidate, a subblock-based temporal motion vector prediction (SbTMVP) candidate, an inherited affine merge (I-AffineMVP) candidate, or a constructed affine merge (C-AffineMVP) candidate.

Aspect 62: The method of claim 54, further comprising reordering the first group of prediction candidates based on cost values.

Aspect 63: The method of claim 62, wherein the at least one processor is configured to reorder the first group of prediction candidates in ascending order based on the cost values.

Aspect 64: The method of claim 62, wherein the cost values are based on template matching Aspect 65: The method of claim 54, further comprising discarding at least one candidate from the reordered first group of prediction candidates prior to adding the first merge candidate to the candidate list.

Aspect 66: The method of claim 54, further comprising generating a prediction for a current block of the video data based on the candidate list.

Aspect 67: The method of claim 66, wherein the at least one processor is configured to: decode the current block of the video data based on the prediction.

Aspect 68: The method of claim 66, wherein the at least one processor is configured to: encode the current block of the video data based on the prediction.

Aspect 69: The method of claim 54, further comprising displaying images from the video data.

Aspect 70: The method of claim 54, further comprising capturing one or more frames associated with the video data.

Aspect 71: The method of claim 54, wherein the first group of prediction candidates includes fewer prediction candidates than the first plurality of prediction candidates.

Aspect 72: A non-transitory computer-readable medium having stored thereon instructions that, when executed by at least one processor, cause the at least one processor to: obtain a first plurality of prediction candidates associated with video data; determine a first group of prediction candidates at least in part by applying a first grouping method to the first plurality of prediction candidates; reorder the first group of prediction candidates; select a first merge candidate from the reordered first group of prediction candidates; and add the first merge candidate to a candidate list.

Aspect 73: The non-transitory computer-readable medium of claim 72, wherein the instructions further cause the at least one processor to determine a second group of prediction candidates at least in part by applying a second grouping method to the candidate list.

Aspect 74: The non-transitory computer-readable medium of claim 73, wherein the instructions further cause the at least one processor to: reorder the second group of prediction candidates; select a second merge candidate from the reordered second group of prediction candidates; and add the second merge candidate to the candidate list.

Aspect 75: The non-transitory computer-readable medium of claim 72, wherein the candidate list is a merge candidate list used for a merge mode.

Aspect 76: The non-transitory computer-readable medium of claim 72, wherein the instructions further cause the at least one processor to: determine that the first merge candidate is not in the candidate list; and add the first merge candidate to the candidate list based on the determination that the first merge candidate is not in the candidate list.

Aspect 77: The non-transitory computer-readable medium of claim 72, wherein the first grouping method is based on a plurality of candidate types associated with the first plurality of prediction candidates.

Aspect 78: The non-transitory computer-readable medium of claim 77, wherein the candidate list includes the first merge candidate in a predefined order based on the plurality of candidate types.

Aspect 79: The non-transitory computer-readable medium of claim 78, herein the plurality of candidate types include at least one of a spatial motion vector predictor (SMVP) type, a temporal motion vector predictor (TMVP) type, a non-adjacent temporal motion vector predictor (NA-TMVP) candidate, a history-based motion vector predictor (HMVP) candidate, a subblock-based temporal motion vector prediction (SbTMVP) candidate, an inherited affine merge (I-AffineMVP) candidate, or a constructed affine merge (C-AffineMVP) candidate.

Aspect 80: The non-transitory computer-readable medium of claim 72, wherein the first grouping method is one of a temporal motion vector predictor (TMVP) or a non-adjacent temporal motion vector predictor (NA-TMVP).

Aspect 81: The non-transitory computer-readable medium of claim 72, wherein the instructions further cause the at least one processor to reorder the first group of prediction candidates based on cost values.

Aspect 82: The non-transitory computer-readable medium of claim 81, wherein the instructions further cause the at least one processor to reorder the first group of prediction candidates based on cost values.

Aspect 83: The non-transitory computer-readable medium of claim 81, wherein the instructions further cause the at least one processor to reorder the first group of prediction candidates in ascending order based on the cost values.

Aspect 84: The non-transitory computer-readable medium of claim 72, wherein the instructions further cause the at least one processor to discard at least one candidate from the reordered first group of prediction candidates prior to adding the first merge candidate to the candidate list.

Aspect 85: The non-transitory computer-readable medium of claim 72, wherein the instructions further cause the at least one processor to generate a prediction for a current block of the video data based on the candidate list.

Aspect 86: The non-transitory computer-readable medium of claim 86, wherein the instructions further cause the at least one processor to decode the current block of the video data based on the prediction.

Aspect 87: The non-transitory computer-readable medium of claim 86, wherein the instructions further cause the at least one processor to encode the current block of the video data based on the prediction.

Aspect 88. The non-transitory computer-readable medium of claim 72, wherein the instructions further cause the at least one processor to display images from the video data.

Aspect 89. The non-transitory computer-readable medium of claim 72, wherein the instructions further cause the at least one processor to capture one or more frames associated with the video data.

Aspect 90. The non-transitory computer-readable medium of claim 72, wherein the first group of prediction candidates includes fewer prediction candidates than the first plurality of prediction candidates.

What is claimed is:

1. An apparatus for processing video data, the apparatus comprising:
  at least one memory; and
  at least one processor coupled to the at least one memory, the at least one processor being configured to:
    obtain a plurality of prediction candidates associated with video data, the plurality of prediction candidates including at least a first group of prediction candidates including N1 prediction candidates and a second group of prediction candidates including N2 prediction candidates, N1 and N2 being positive integer values and the N1 prediction candidates and the N2 prediction candidates being different;

determine, from among the plurality of prediction candidates, the first group of prediction candidates that includes the N1 prediction candidates;

reorder, based on a respective cost associated with each prediction candidate among the N1 prediction candidates, the N1 prediction candidates included within the first group of prediction candidates to determine a first reordered group of prediction candidates;

select, from the first reordered group of prediction candidates, a first set of prediction candidates that includes M1 prediction candidates, M1 being a positive integer value that is less than N1; and add, from among the first reordered group of prediction candidates, only the first set of prediction candidates to a candidate list.

2. The apparatus of claim 1, wherein the at least one processor is configured to determine, from the plurality of prediction candidates, the second group of prediction candidates that includes the N2 prediction candidates.

3. The apparatus of claim 2, wherein the at least one processor is configured to:

reorder the N2 prediction candidates within the second group of prediction candidates to determine a second reordered group of prediction candidates;

select, from the second reordered group of prediction candidates, a second set of prediction candidates including M2 prediction candidates, M2 being a positive integer value; and add, from among the second reordered group of prediction candidates, only the second set of prediction candidates to the candidate list.

4. The apparatus of claim 1, wherein the candidate list is a merge candidate list used for a merge mode.

5. The apparatus of claim 3, wherein the at least one processor is configured to determine the first group of prediction candidates and the second group of prediction candidates based on a plurality of candidate types associated with the plurality of prediction candidates.

6. The apparatus of claim 5, wherein the first group of prediction candidates consists of temporal motion vector predictor (TMVP) candidates and the second group of prediction candidates consists of non-adjacent spatial motion vector predictor (NA-SMVP) candidates, and wherein the at least one processor is configured to add the first set of prediction candidates to the candidate list prior to the addition of the second set of prediction candidates to the candidate list.

7. The apparatus of claim 1, wherein the at least one processor is configured to reorder the N1 prediction candidates in ascending order based on the respective cost value of each prediction candidate among the N1 prediction candidates.

8. The apparatus of claim 7, wherein each respective cost value is determined based on template matching.

9. The apparatus of claim 1, wherein the at least one processor is configured to:

generate a prediction for a current block of the video data based on the candidate list.

10. The apparatus of claim 9, wherein the at least one processor is configured to:

decode the current block of the video data based on the prediction.

11. The apparatus of claim 9, wherein the at least one processor is configured to:

encode the current block of the video data based on the prediction.

12. The apparatus of claim 1, further comprising:

a display device coupled to the at least one processor and configured to display images from the video data.

13. The apparatus of claim 1, further comprising:

one or more wireless interfaces coupled to the at least one processor, the one or more wireless interfaces comprising one or more baseband processors and one or more transceivers.

14. The apparatus of claim 1, further comprising:

at least one camera configured to capture one or more frames associated with the video data.

15. The apparatus of claim 1, wherein the first group of prediction candidates includes fewer prediction candidates than the plurality of prediction candidates.

16. A method of coding video data, the method comprising:

obtaining a plurality of prediction candidates associated with video data, the plurality of prediction candidates including at least a first group of prediction candidates including N1 prediction candidates and a second group of prediction candidates including N2 prediction candidates, N1 and N2 being positive integer values and the N1 prediction candidates and the N2 prediction candidates being different;

determining, from among the plurality of prediction candidates, the first group of prediction candidates that includes the N1 prediction candidates;

reordering, based on a respective cost associated with each prediction candidate among the N1 prediction candidates, the N1 prediction candidates included within the first group of prediction candidates to determine a first reordered group of prediction candidates;

selecting, from the first reordered group of prediction candidates, a first set of prediction candidates that includes M1 prediction candidates, M1 being a positive integer value that is less than N1; and adding, from among the first reordered group of prediction candidates, only the first set of prediction candidates to a candidate list.

17. The method of claim 16, further comprising determining, from the plurality of prediction candidates, the second group of prediction candidates that includes the N2 prediction candidates.

18. The method of claim 17, further comprising:

reordering the N2 prediction candidates within the second group of prediction candidates to determine a second reordered group of prediction candidates;

selecting, from the second reordered group of prediction candidates, a second set of prediction candidates including M2 prediction candidates, M2 being a positive integer value; and adding, from among the second reordered group of prediction candidates, only the second set of prediction candidates to the candidate list.

19. The method of claim 16, wherein the candidate list is a merge candidate list used for a merge mode.

20. The method of claim 18, further comprising determining the first group of prediction candidates and the second group of prediction candidates based on a plurality of candidate types associated with the plurality of prediction candidates.

21. The method of claim 20, wherein the first group of prediction candidates consists of temporal motion vector predictor (TMVP) candidates and the second group of prediction candidates consists of non-adjacent spatial motion vector predictor (NA-SMVP) candidates, the method further comprising add the first set of prediction candidates to the candidate list prior to the addition of the second set of prediction candidates to the candidate list.

22. The method of claim 16, further comprising reordering the N1 prediction candidates in ascending order based on the respective cost value of each prediction candidate among the N1 prediction candidates.

23. The method of claim 22, wherein each respective cost value is determined based on template matching.

24. The method of claim 16, further comprising generating a prediction for a current block of the video data based on the candidate list.

25. The method of claim 16, wherein the first group of prediction candidates includes fewer prediction candidates than the plurality of prediction candidates.

* * * * *